United States Patent
Ikeda

(10) Patent No.: US 7,915,756 B2
(45) Date of Patent: Mar. 29, 2011

(54) SEMICONDUCTOR DEVICE

(75) Inventor: Takayuki Ikeda, Atsugi (JP)

(73) Assignee: Semiconductor Energy Laboratory Co., Ltd., Atsugi-shi, Kanagawa-ken (JP)

(*) Notice: Subject to any disclaimer, the term of this patent is extended or adjusted under 35 U.S.C. 154(b) by 339 days.

(21) Appl. No.: 12/155,339

(22) Filed: Jun. 3, 2008

(65) Prior Publication Data

US 2008/0303345 A1 Dec. 11, 2008

(30) Foreign Application Priority Data

Jun. 7, 2007 (JP) ................. 2007-151453

(51) Int. Cl.
*H02J 3/14* (2006.01)
(52) U.S. Cl. .......................................... 307/31
(58) Field of Classification Search ........... 307/31
See application file for complete search history.

(56) References Cited

U.S. PATENT DOCUMENTS

| 6,049,903 | A | 4/2000 | Nishimura |
| 6,756,804 | B2 * | 6/2004 | Ishibashi ............... 324/765 |
| 7,241,666 | B2 * | 7/2007 | Goto et al. ............. 438/455 |
| 2003/0228719 | A1 | 12/2003 | Koizumi et al. |
| 2007/0063920 | A1 | 3/2007 | Shionoiri et al. |
| 2007/0089028 | A1 | 4/2007 | Ito et al. |

FOREIGN PATENT DOCUMENTS

| JP | 63-164630 | 7/1988 |
| JP | 10-107650 | 4/1998 |
| JP | 2001-331772 | 11/2001 |
| JP | 2002-083277 | 3/2002 |
| JP | 2004-014956 | 1/2004 |

\* cited by examiner

*Primary Examiner* — Michael Rutland Wallis
(74) *Attorney, Agent, or Firm* — Eric J. Robinson; Robinson Intellectual Property Law Office, P.C.

(57) ABSTRACT

A semiconductor device including a redundant circuit which can operate even when power source in a circuit in part of the redundant circuit is short-circuited. A power source circuit, a power source control circuit to which a power source potential is input from the power source circuit, and a first functional circuit and a second functional circuit connected to the power source control circuit are provided for a semiconductor device. The power source control circuit selects one of the first functional circuit and the second functional circuit and judges whether power source is short-circuited or not. When power source is short-circuited, power source supply stops and other functional circuits are supplied with power source.

15 Claims, 15 Drawing Sheets

FIG. 3

| 602 | 603 | 604 | 605 |
|-----|-----|-----|-----|
| 0 | 0 | 0 | 0 |
| 0 | 0 | 1 | 0 |
| 0 | 1 | 0 | 0 |
| 0 | 1 | 1 | 1 |
| 1 | 0 | 0 | 0 |
| 1 | 0 | 1 | 1 |
| 1 | 1 | 0 | 1 |
| 1 | 1 | 1 | 1 |

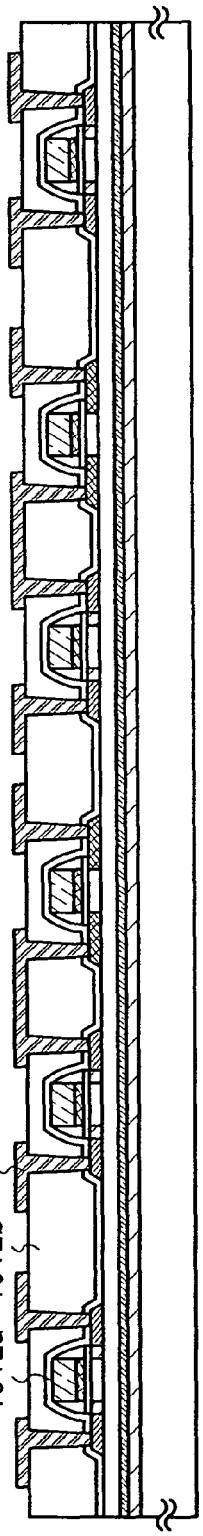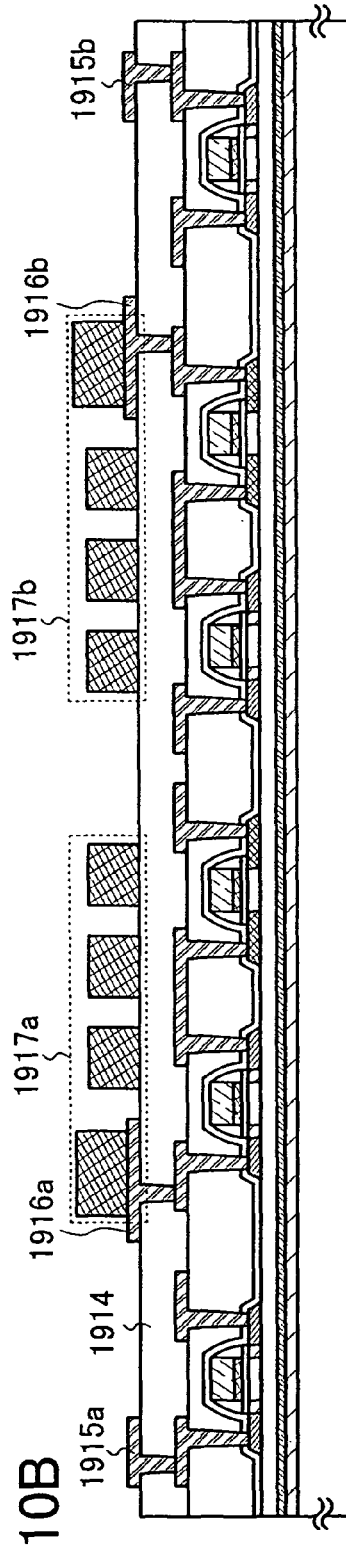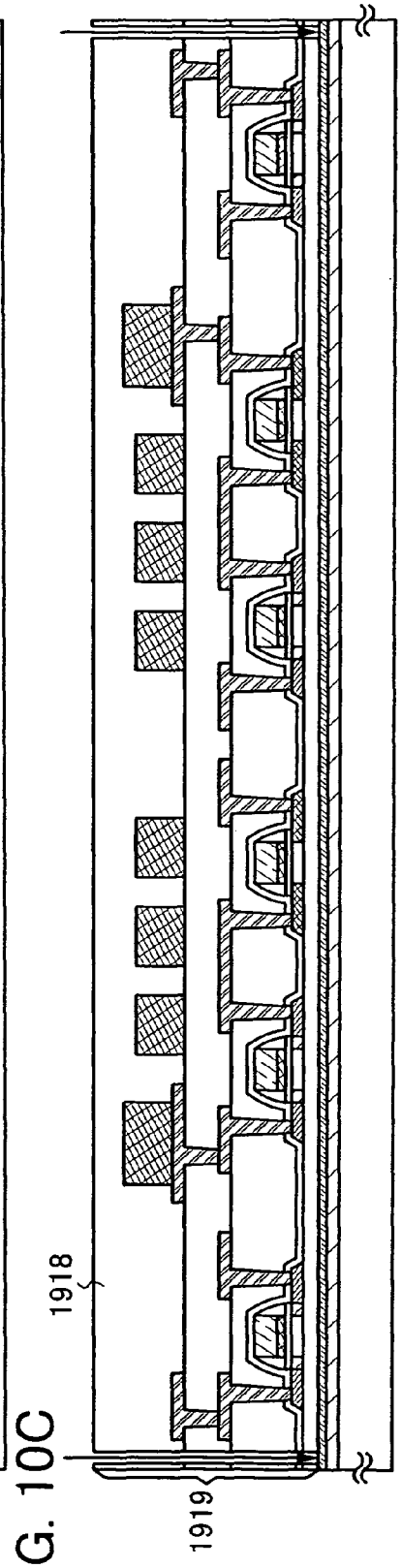

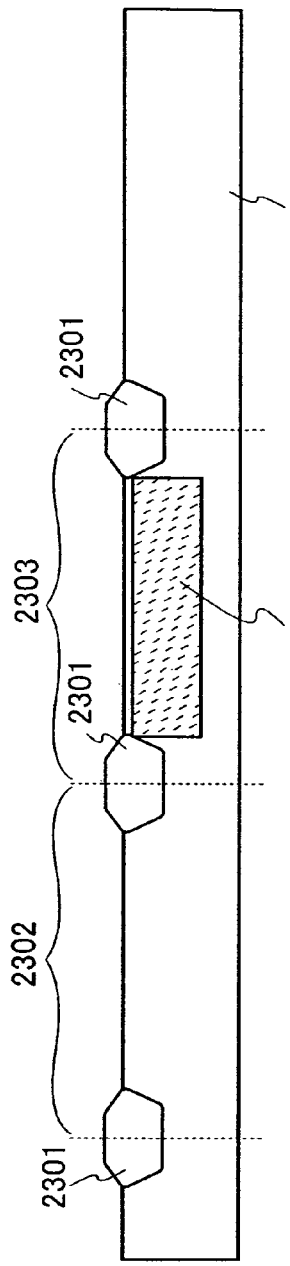
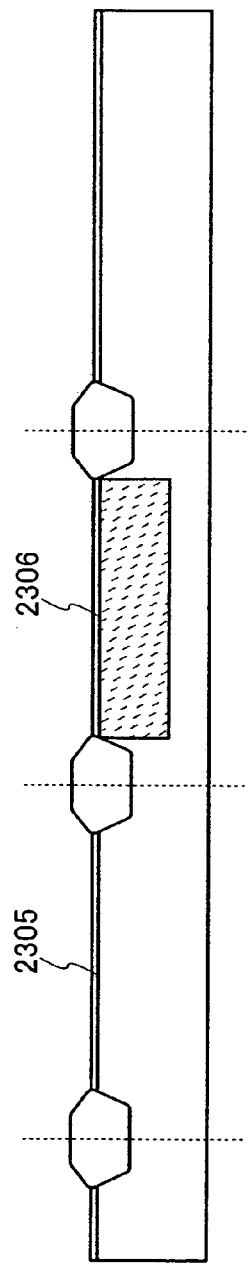
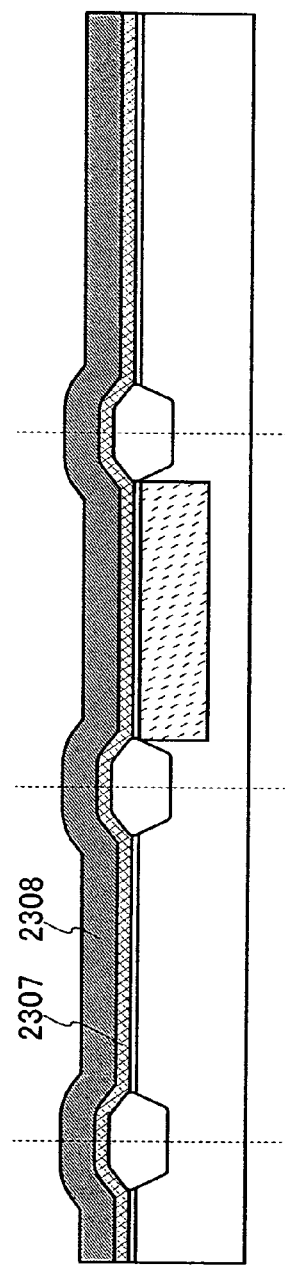
FIG. 12A
FIG. 12B
FIG. 12C

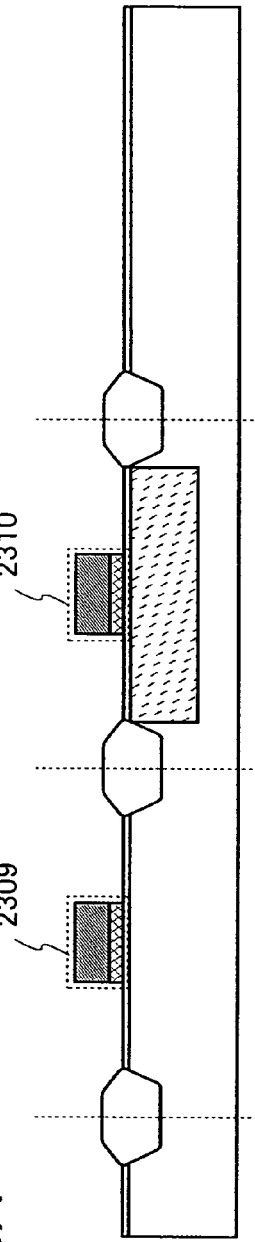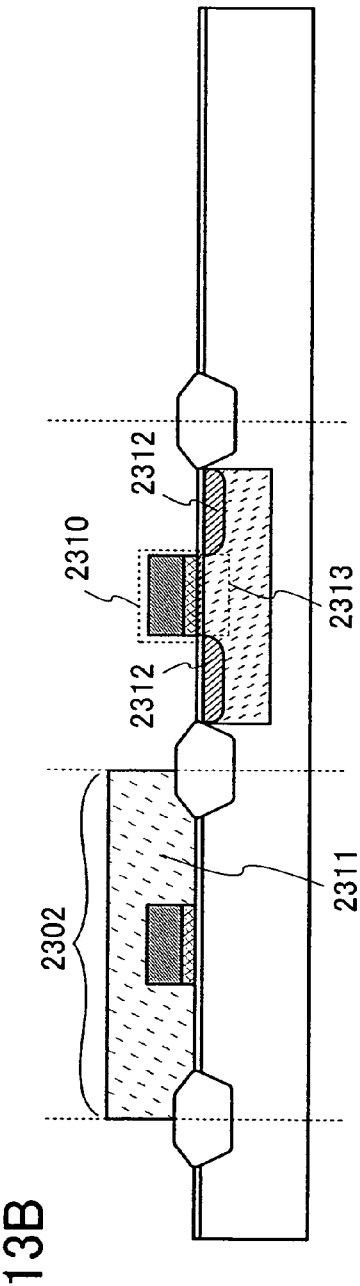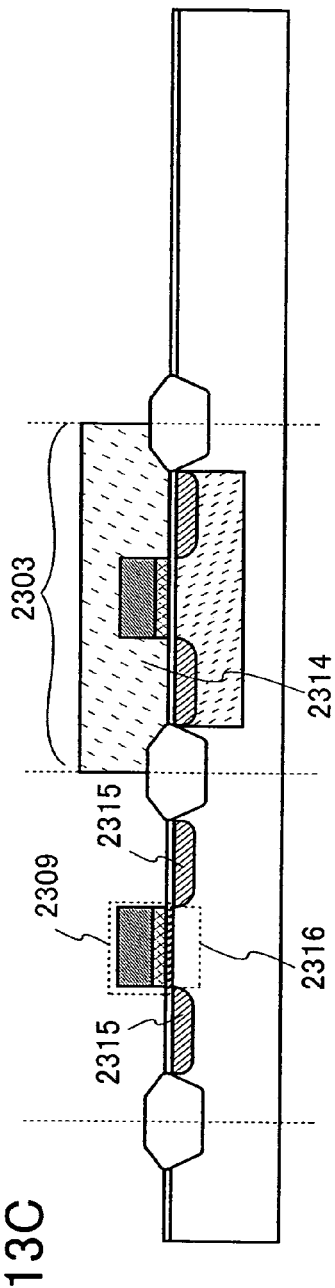

SEMICONDUCTOR DEVICE

BACKGROUND OF THE INVENTION

1. Field of the Invention

The present invention relates to a semiconductor device. Specifically, the present invention relates to a semiconductor device which performs communication without contact.

2. Description of the Related Art

In recent years, an individual identification technology using electromagnetic waves, radio wave, or the like for wireless communication has attracted attention. In particular, as a semiconductor device which communicates data by wireless communication, an individual identification technology using an RFID (radio frequency identification) tag has attracted attention. The RFID tag (hereinafter, simply referred to as RFID) is also referred to as an IC (integrated circuit) tag, an RF tag, a wireless tag, an electronic tag, an IC chip, a wireless chip, a transponder, or a data carrier. The individual identification technology using RFID has been useful for production, management, or the like of an individual object, and application to personal authentication has been promoted (Patent Document 1: Japanese Published Patent Application No. 2002-083277).

SUMMARY OF THE INVENTION

RFID is often embedded in a thin card to be used. On the other hand, compared to an LSI which is generally protected by a package formed of epoxy resin or the like for sealing, and a conventional liquid crystal display device, an EL (electromagnetic luminescence) display device, and the like whose circuit portions are protected by glass substrates and counter substrates, a protective material of RFID is generally thin and cannot protect the RFID adequately, resistance of RFID to external force is inadequate.

In general, since the level planarity of a glass substrate, a plastic substrate, or the like is lower than that of a semiconductor substrate or an SOI substrate, processing precision is poor and a design is large. That is, a design rule such as the distance between wirings and the width of wirings becomes large and a layout area widens. A circuit with a large design is likely to be broken. Further, in the case of a substrate which can be deformed easily such as a plastic substrate, even if external force is not directly applied to a wiring and a TFT, force is applied to the wiring and the TFT due to distortion of the substrate in some cases; therefore, a countermeasure against external force is necessary.

Defects of a semiconductor device can be classified into a defect at an initial stage of manufacturing, a defect due to deterioration of a material, and a defect due to external force. The defect at the initial stage can be dealt with in an inspection before shipment. As a countermeasure against the defect at the initial stage and the defect due to deterioration, a redundant circuit is used in general. When a malfunction of a circuit is detected, a redundant circuit which is provided in advance can be substituted for the malfunctioning circuit. Further, a majority decision circuit is used in order to automatically avoid defects. In the majority decision circuit, three or more circuits are provided in advance and a value output with the most results is adopted as a correct one. Note that the redundant circuit is a circuit on which a plurality of circuits (also referred to as functional circuits) each having a certain function is mounted.

FIG. 2 is a block diagram of a semiconductor device provided with a conventional redundant circuit and a majority decision circuit. In FIG. 2, a semiconductor device 600 includes a power source circuit 601, a first functional circuit 602, a second functional circuit 603, a third functional circuit 604, and a majority decision circuit 605. The power source circuit 601 is connected to the first functional circuit 602, the second functional circuit 603, and the third functional circuit 604 and supplies power source to the functional circuits. Each of the first functional circuit 602, the second functional circuit 603, and the third functional circuit 604 outputs an output signal to the majority decision circuit 605. The output signals from each of the first functional circuit 602, the second functional circuit 603, and the third functional circuit 604 are not limited to one kind of an output signal. Focusing on one of the output signals, the majority decision circuit performs algebra operation thereto shown in FIG. 3 to output one signal from the majority decision circuit 605. For example, when input from the first functional circuit 602, the second functional circuit 603, and the third functional circuit 604 are 1, 1, 0, respectively, output from the majority decision circuit 605 is 1. Note that 0 means low potential, that is, a potential close to a ground potential, and 1 means high potential, that is, a potential close to a power source potential.

However, in conventional redundant circuits including a structure having majority decision circuits, power consumption is high because all functional circuits to be redundant circuits operate. Note that in the conventional redundant circuits, when power source is short-circuited by breakdown, all the redundant circuits become inoperable. Short circuit of power source is a drop in a potential of a power source node caused by electrical connection between the power source node and a ground node with lower resistance than that in a normal state. Unlike the defect at the initial stage of manufacturing, in many of circuits broken by external force, power source is short-circuited and voltage drop occurs; therefore, the majority decision circuits cannot deal with this.

In view of the problems mentioned above, an object of the present invention is to provide a semiconductor device provided with a system in which a redundant circuit operates even if power source is short-circuited.

One aspect of the present invention is a semiconductor device including a plurality of circuits having similar functions, electric power is supplied in sequence to each circuit for judging whether power source is short-circuited or not, power source supply to the circuit is stopped when power source is short-circuited, and electric power is selectively supplied to a next circuit.

Another aspect of the present invention is a semiconductor device including a plurality of circuits having similar functions, each circuit is scanned, and power source is supplied to a circuit whose power source is judged as being not short-circuited.

Another aspect of the present invention is a semiconductor device in which a plurality of circuits having similar functions and a switch for not supplying power source to a functional circuit with a short-circuited power source are provided, and the switch is controlled by a power source control circuit.

Another aspect of the present invention is a semiconductor device in which power source supply to a power source control circuit and power source supply for a plurality of circuits having similar functions for operation are separated from each other. By separating power source supply, a power source potential of the power source control circuit does not become lower than an operation limit. Separating power source supply means generating a plurality of power sources in a power source circuit. Alternatively, one power source potential may be generated in the power source circuit and be distributed to a plurality of power source nodes through a resistor. By adjusting a resistance value, the power source potential of the power source control circuit can be made not to be lower than the operation limit even when power source in a circuit temporarily supplied with electric power is short-circuited. Note that the power source control circuit includes a short circuit judgment circuit.

Moreover, in the present invention, a power source circuit, a plurality of circuits to be controlled, and a power source control circuit can be formed over the same substrate.

One aspect of the present invention is a semiconductor device in which one of a plurality of redundant circuits having similar functions is supplied with power source.

In the present invention, whether power source is short-circuited or not is judged in accordance with a power source potential of a circuit after a certain amount of time from when power source supply is started. Alternatively, in the present invention, whether power source is short-circuited or not is judged in accordance with an electric current flowing through a power source supply line.

More specifically, one aspect of the present invention is a semiconductor device including a power source circuit, a first functional circuit and a second functional circuit which are electrically connected to the power source circuit, and a power source control circuit which is electrically connected to the power source circuit, the first functional circuit, and the second functional circuit and is configured to select one of the first functional circuit and the second functional circuit and to control a voltage value output from the power source circuit to a selected functional circuit.

One aspect of the present invention is a semiconductor device including a power source circuit, a first functional circuit and a second functional circuit which are electrically connected to the power source circuit, and a power source control circuit electrically connected to the power source circuit, the first functional circuit, and the second functional circuit. The power source control circuit includes a selector circuit configured to select one of the first functional circuit and the second functional circuit, a power source distribution circuit configured to output a voltage to a selected functional circuit, a timer circuit configured to count a predetermined period, a short circuit judgment circuit configured to judge whether power source in a selected functional circuit is short-circuited or not during the predetermined period, and a voltage adjustment circuit configured to control a voltage value output from the power source circuit to a functional circuit selected by the selector circuit in accordance with a result from the short circuit judgment circuit.

Note that in the present invention, the short circuit judgment circuit may judge whether power source is short-circuited or not by judging a voltage value input to a functional circuit selected by the selector circuit.

Note that in the present invention, the power source circuit, the power source control circuit, and the functional circuit may be provided over the same substrate.

One aspect of the present invention is a semiconductor device including a power source circuit, a first redundant circuit and a second redundant circuit which are electrically connected to the power source circuit, and a power source control circuit electrically connected to the power source circuit, the first redundant circuit, and the second redundant circuit. The first redundant circuit and the second redundant circuit each includes first to third functional circuits and a majority decision circuit electrically connected to the first to third functional circuits. The power source control circuit includes a selector circuit configured to select one of the first redundant circuit and the second redundant circuit, a power source distribution circuit configured to output a voltage to a selected redundant circuit, a timer circuit configured to count a predetermined period, a short circuit judgment circuit configured to judge whether power source in a selected redundant circuit is short-circuited or not during the predetermined period, and a voltage adjustment circuit configured to control a voltage value output from the power source circuit to a redundant circuit selected by the selector circuit in accordance with a result from the short circuit judgment circuit.

Note that in the present invention, the short circuit judgment circuit may judge whether power source is short-circuited or not by judging a voltage value input to a redundant circuit selected by the selector circuit.

Note that in the present invention, the power source circuit, the power source control circuit, the first redundant circuit and the second redundant circuit may be provided over the same substrate.

One aspect of the present invention is a semiconductor device including an antenna portion configured to perform transmission/reception of a signal, an analog portion configured to generate power source voltage in accordance with a signal received by the antenna portion, and a logic portion configured to perform arithmetic processing by using a signal received by the antenna portion. The analog portion includes a power source circuit, a reset circuit, a clock generation circuit, a demodulation circuit, and a modulation circuit. The logic portion includes a ROM, a RAM, a controller, and an arithmetic processing circuit portion. The arithmetic processing circuit portion includes a power source control circuit, a first CPU, a second CPU, and a signal selection circuit. The power source control circuit includes a selector circuit configured to select one of the first CPU and the second CPU, a power source distribution circuit configured to output a voltage to a selected CPU, a timer circuit configured to count a predetermined period, a short circuit judgment circuit configured to judge whether power source in the selected CPU is short-circuited or not during the predetermined period, and a voltage adjustment circuit configured to adjust a voltage value output to the selected CPU in accordance with a result from the short circuit judgment circuit.

Note that in the present invention, the short circuit judgment circuit judges whether power source is short-circuited or not by judging a voltage value to be input to the CPU selected by the selector circuit.

Note that in the present invention, the antenna portion, the logic portion and the analog portion may be provided over the same substrate.

As a substrate used for a semiconductor device of the present invention, a glass substrate, a substrate having flexibility such as and a plastic substrate can be used. In addition, a semiconductor substrate or an SOI substrate can also be used because effect of the present invention can be obtained even though the semiconductor substrate and the SOI substrate are less likely to be broken. Moreover, a semiconductor film used for the semiconductor device of the present invention is not limited to a non-single crystalline semiconductor film.

Note that in the present invention, as a functional circuit, any circuit can be applied as long as the circuit has a predetermined function such as a CPU (central processing unit), a memory, a circuit which decodes a command included in a communication signal, or the like. In addition, one circuit may have a plurality of functions.

By employing the present invention, a semiconductor device can operate, even if one of a plurality of redundant circuits has short-circuited power source, by using other redundant circuits.

In addition, by employing the present invention, a semiconductor device with low power consumption can be obtained.

BRIEF DESCRIPTION OF THE DRAWINGS

In the accompanying drawings:
FIG. 3 is an operation table for a majority decision circuit in a conventional semiconductor device;
FIGS. 10A to 10C are cross-sectional views of a manufacturing method of a semiconductor device of the present invention in Embodiment Mode 4;
FIGS. 12A to 12C are cross-sectional views of a manufacturing method of a semiconductor device of the present invention in Embodiment Mode 5;
FIGS. 13A to 13C are cross-sectional views of a manufacturing method of a semiconductor device of the present invention in Embodiment Mode 5.

DETAILED DESCRIPTION OF THE INVENTION

Figure 1:
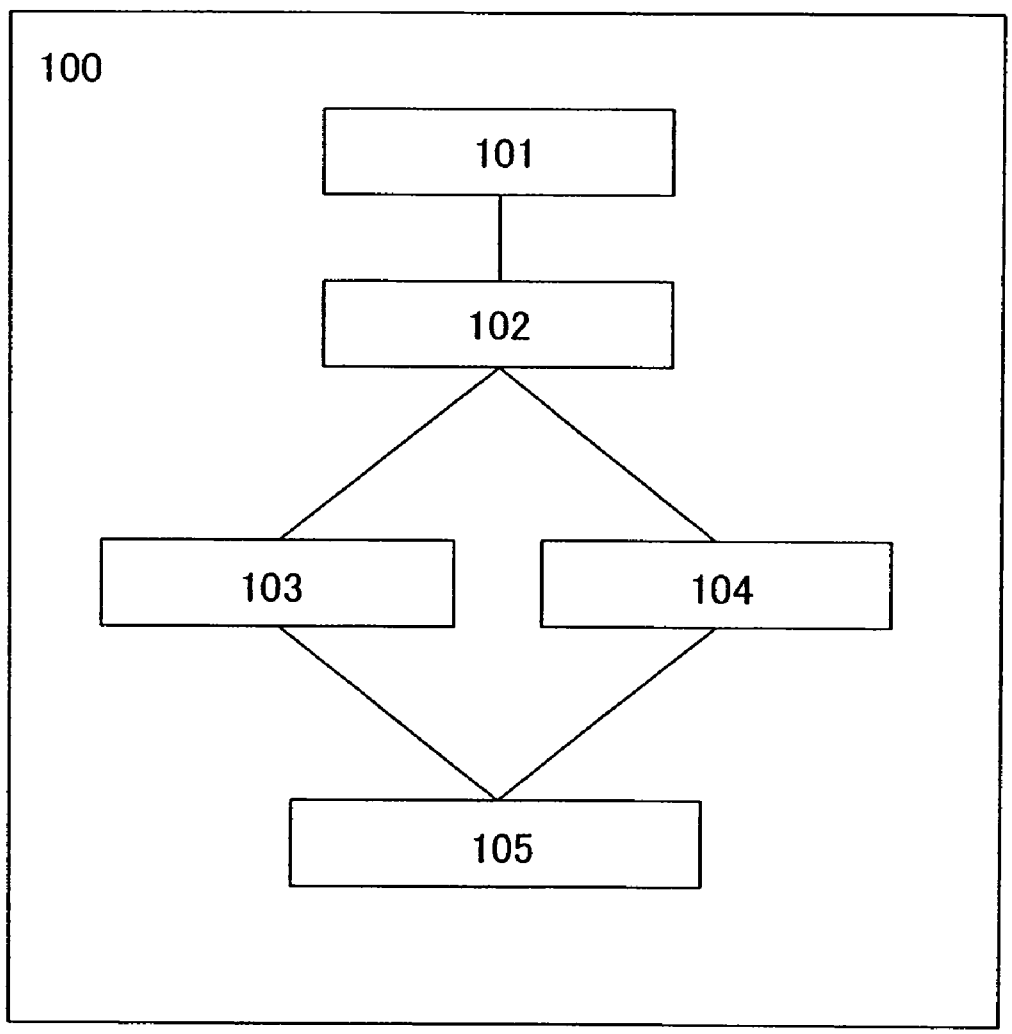
FIG. 1 is a block diagram illustrating a structure of a semiconductor device of the present invention in Embodiment Mode 1.
Figure 2:
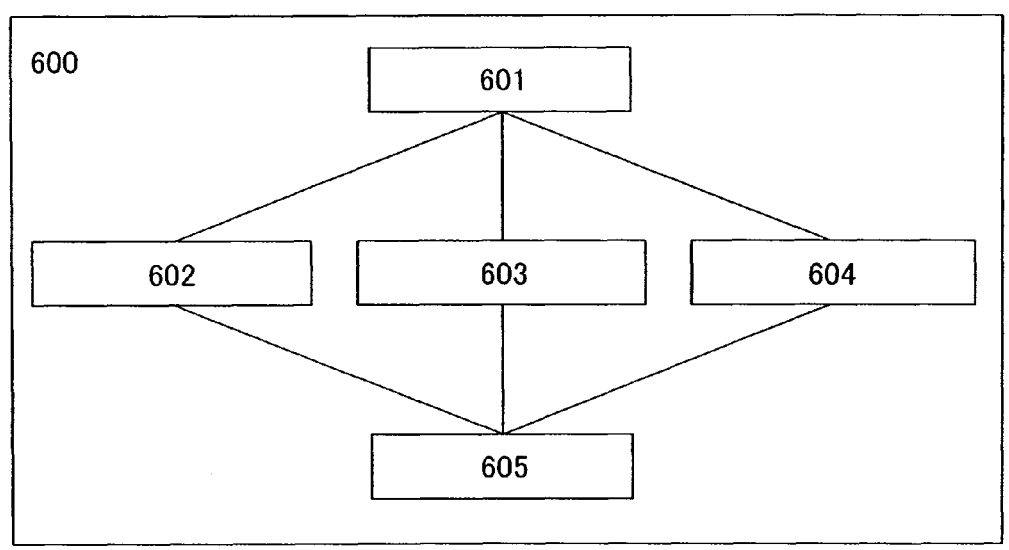
FIG. 2 is a diagram illustrating a structure of a semiconductor device including a conventional redundant circuit.

Hereinafter, embodiment modes of the present invention will be described with reference to the accompanying drawings. However, the present invention can be embodied in many different modes and it is easily understood by those skilled in the art that modes and details can be variously changed without departing from the scope and the spirit of the present invention. Therefore, the present invention should not be limited to the descriptions of the embodiment modes below. Note that in all the drawings for describing the embodiment modes, portions that are the same or portions having similar functions are denoted by the same reference numerals, and repeated description is omitted.

Embodiment Mode 1

In this embodiment mode, an example of a semiconductor device of the present invention will be described with reference to the accompanying drawings.

FIG. 1 is a block diagram illustrating a concept of a semiconductor device which is to be described in this embodiment mode. In FIG. 1, a semiconductor device 100 includes a power source circuit 101, a power source control circuit 102, a first functional circuit 103, a second functional circuit 104, and a signal selection circuit 105. The power source circuit 101 is connected to the power source control circuit 102, the power source control circuit 102 is connected to the first functional circuit 103 and the second functional circuit 104, and the first functional circuit 103 and the second functional circuit 104 are connected to the signal selection circuit 105.

The first functional circuit 103 and the second functional circuit 104 are not supplied with power source at the same time. Power source generated or stabilized by the power source circuit 101 is distributed to the first functional circuit 103 or the second functional circuit 104 by the power source control circuit 102. A signal output from the first functional circuit 103 or the second functional circuit 104 is selected by the signal selection circuit 105.

Figure 4:
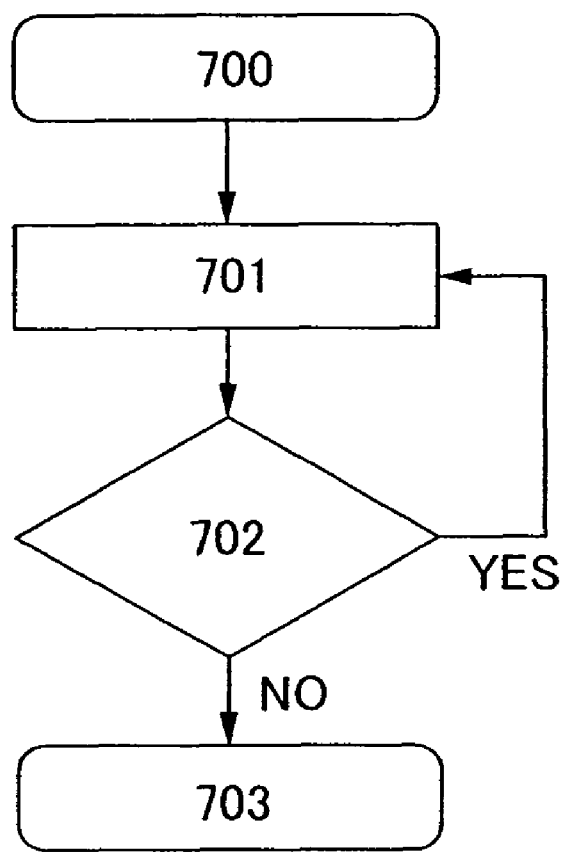
FIG. 4 is a flow chart showing operation of a semiconductor device of the present invention.

Operation of the power source control circuit will be described with reference to a flow chart shown in FIG. 4.

In Start 700, when the semiconductor device 100 is supplied with power source, the power source control circuit 102 is first supplied with power source. At that time, the first functional circuit 103 and the second functional circuit 104 are not supplied with power source. Then, system reset is released and operation goes on to the following Selector Change 701. Immediately after the semiconductor device 100 is supplied with power source, that is, almost at the same time when the semiconductor device 100 is supplied with power source without distinguishing a specific state such as Start state or Selector Change state, a value of a selector may be determined and the first functional circuit 103 may be supplied with power source. However, in this embodiment mode, the first functional circuit 103 is preferably not supplied with power source at the same time in order to fix a condition for judging whether power source is short-circuited or not.

In Selector Change state immediately after Starting state, the value of the selector is set to be 1 in the power source control circuit 102, and the first functional circuit 103 is supplied with power source for judging whether power source is short-circuited or not.

In Short Circuit Judgment 702, when a power source potential of the first functional circuit 103 becomes equal to or higher than a pre-set value during a certain amount of time, power source is judged as being not short-circuited. If the power source is not short-circuited, operation goes on to Finish state. Operation may go on to Finish state immediately after the power source potential of the first functional circuit 103 or the second functional circuit 104 becomes equal to or higher than a certain value, or after waiting for a pre-set certain time.

On the other hand, if the power source potential of the first functional circuit 103 becomes equal to or lower than a certain value during a certain amount of time, power source of the first functional circuit 103 is judged as being short-circuited and operation goes back to Selector Change 701. In Selector Change state, the value of the selector is set to be 2 by adding 1, and the second functional circuit 104 is supplied with power source for short circuit judgment of power source.

After power source is judged as being not short-circuited and operation goes on to Finish 703, an electric current to the selected functional circuit is increased. Then, a reset release signal is transmitted to the selected functional circuit, so that the power source control circuit 102 stops operating by itself. Note that to stop operation means not to change a state of each node in the power source control circuit 102.

Although FIG. 1 for describing this embodiment mode shows an example in which two functional circuits are provided, the number of the functional circuits is not limited to two. In the case where three or more functional circuits are provided, the same judgment operation is repeated in each functional circuit to find a functional circuit without short-circuited power source. Moreover, in this embodiment mode, if power sources of all the functional circuits provided are judged as being short-circuited, the power source control circuit stops in a state in which all the functional circuits are not supplied with power source. Among the functional circuits with the short-circuited power sources, the functional circuit with the highest voltage, that is, the functional circuit with the smallest amount of electric current due to short-circuited power source may be selected again; however, in actual breakdown, the amounts of electric current due to short-circuited power source are likely to be almost the same regardless of patterns of breakdown. In order to reduce the possibility of breakdown of the power source control circuit, the power source control circuit preferably has simple functions and a small layout.

The signal selection circuit 105 controls an input/output signal of the first functional circuit 103 or the second functional circuit 104. In this embodiment mode, output signals from respective functional circuits can be collected up by a wired OR (NOR) circuit with an open drain. Alternatively, the output signal can be selected by a logic circuit by using a selection signal of the power source control circuit 102. An input terminal can be directly connected to each functional circuit.

Next, a structure of the power source control circuit in this embodiment mode will be described.

Figure 5:
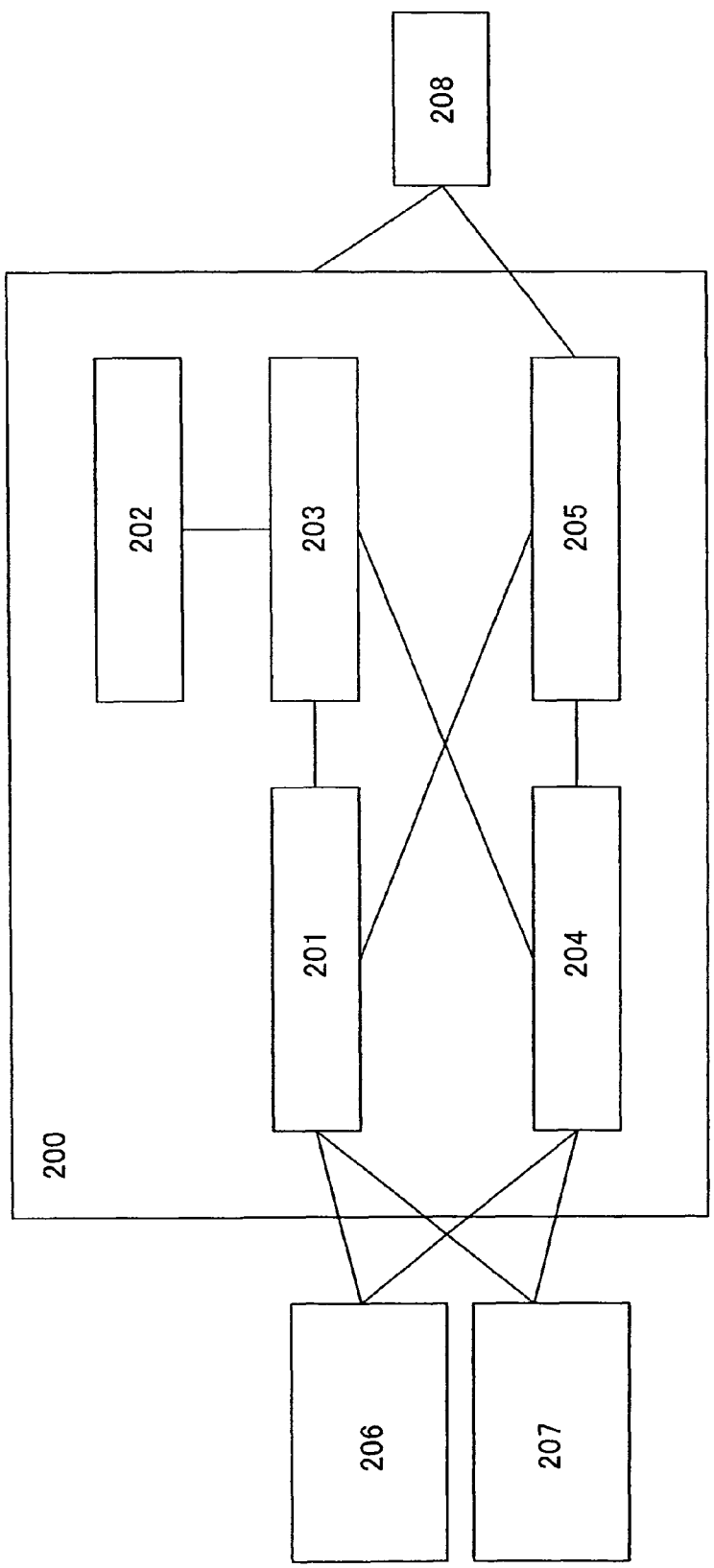
FIG. 5 is a block diagram illustrating a structure of a semiconductor device of the present invention in Embodiment Mode 1.

A block diagram of the structure of the power source control circuit in this embodiment mode is shown in FIG. 5. In FIG. 5, a power source control circuit 200 includes a short circuit judgment circuit 201, a timer circuit 202, a selector circuit 203, a power source distribution circuit 204, and an electric current adjustment circuit 205. The short circuit judgment circuit 201 is connected to the selector circuit 203 and the electric current adjustment circuit 205; the selector circuit 203 is connected to the timer circuit 202 and the power source distribution circuit 204; and the power source distribution circuit 204 is connected to the electric current adjustment circuit 205. In addition, each of the short circuit judgment circuit 201 and the power source distribution circuit 204 is connected to the first functional circuit 206 and the second functional circuit 207. The first functional circuit 206 and the second functional circuit 207 correspond to the the first functional circuit 103 and the second functional circuit 104 in FIG. 1, respectively. The power source is used in order to operate the power source control circuit and in order to transmit power source to each functional circuit through the power source control circuit.

The timer circuit 202 determines a period for monitoring a power source potential of the functional circuit by counting a clock. Alternatively, a function of determining the period for monitoring may be achieved by using a CR circuit, that is, a circuit in which a capacitor element and a resistive element are combined.

The short circuit judgment circuit 201 can be obtained by using a voltage detection circuit. The voltage detection circuit judges whether a power source potential of a functional circuit which is selected by the selector circuit is equal to or higher than a certain pre-set value or not, and transmits the result as a logic signal to the selector circuit 203 and the electric current adjustment circuit 205. The judgment of the potential can be simply performed by an inverter circuit in the logic circuit. The inverter circuit has a threshold voltage, and when an input voltage becomes equal to or higher than the threshold voltage, 0, that is, a Low signal is output. The threshold voltage of the inverter circuit is determined by characteristics or the layout size of a semiconductor element.

The selector circuit 203 can be obtained by using a counter circuit which performs count-up in response to a signal from the timer circuit 202. There is no problem even when the counter circuit performs count-down. In addition, the counter circuit stops counting up when the power source potential of the functional circuit becomes equal to or higher than the pre-set value due to the signal from the short circuit judgment circuit 201.

The short circuit judgment circuit 201 judges a voltage of which functional circuit is to be detected in accordance with a selector value from the selector circuit 203.

In addition, the power source distribution circuit 204 judges which functional circuit is to be supplied with power source in accordance with a selector value from the selector circuit 203.

The electric current adjustment circuit 205 can be obtained by using a resistive element and a switch which are connected in parallel. One end of the parallel connected resistive element and switch is connected to a power source circuit 208. The other end of the parallel connected resistive element and switch is connected to the power source distribution circuit 204. When the short circuit judgment circuit judges power source as being not short-circuited, the switch is turned on and resistance of a power source supply line provided between the power source circuit and the functional circuit which is connected to the power source distribution circuit is reduced. Note that in the short circuit judgment in FIG. 4, supplying power source for judging whether power source is short-circuited or not means limiting an electric current by providing a resistor or the like for the electric current adjustment circuit. If power source is supplied without interposing the resistor, and there is short-circuited power source in the functional circuit, a voltage drop occurs in power source of the power source control circuit and the power source control circuit becomes unable to control. In order to avoid this, a power source node is isolated by employing resistance with which the power source control circuit can operate. As resistance for controlling an electric current, a semiconductor element, contact resistance, wiring resistance, or an organic material can be employed. Although a voltage drop in power source of the power source control circuit cannot be completely prevented, a resistance value is determined so as to limit the voltage drop to be in a range in which the power source control circuit can normally operate. On the other hand, in Finish state in FIG. 4, supplying power source means reducing resistance by turning on a switch provided in another path of electric current which is different from the path in which electric current is limited by interposing a resistive element or the like. This is because a voltage drop may be high due to momentary current consumption when a functional circuit operates in the case where an electric current is limited by using an interposed resistor element, and this causes a malfunctioning in some cases.

The power source distribution circuit 204 transmits power source to a functional circuit selected in accordance with a selector value from the selector circuit 203. The power source distribution circuit 204 can be formed by using the same number of switches as in the functional circuits. A switch to be connected to a power source line of the functional circuit selected by the selector circuit 203 is in an on-state; that is, the switch has low resistance, and a switch to be connected to a power source line of the functional circuit which is not selected by the selector circuit 203 is in an off-state; that is, the switch has high resistance. As a switch, a transistor or the like can be used. In FIG. 5, although power source supplied to a functional circuit is supplied from the power source circuit 208, passes through the electric current adjustment circuit 205, and is distributed by the power source distribution circuit 204, an electric current can be adjusted after distribution. In that case, a layout area is increased because a plurality of electric adjustment circuits is required; however, leakage in the power source distribution circuit can be reduced.

Figure 6:
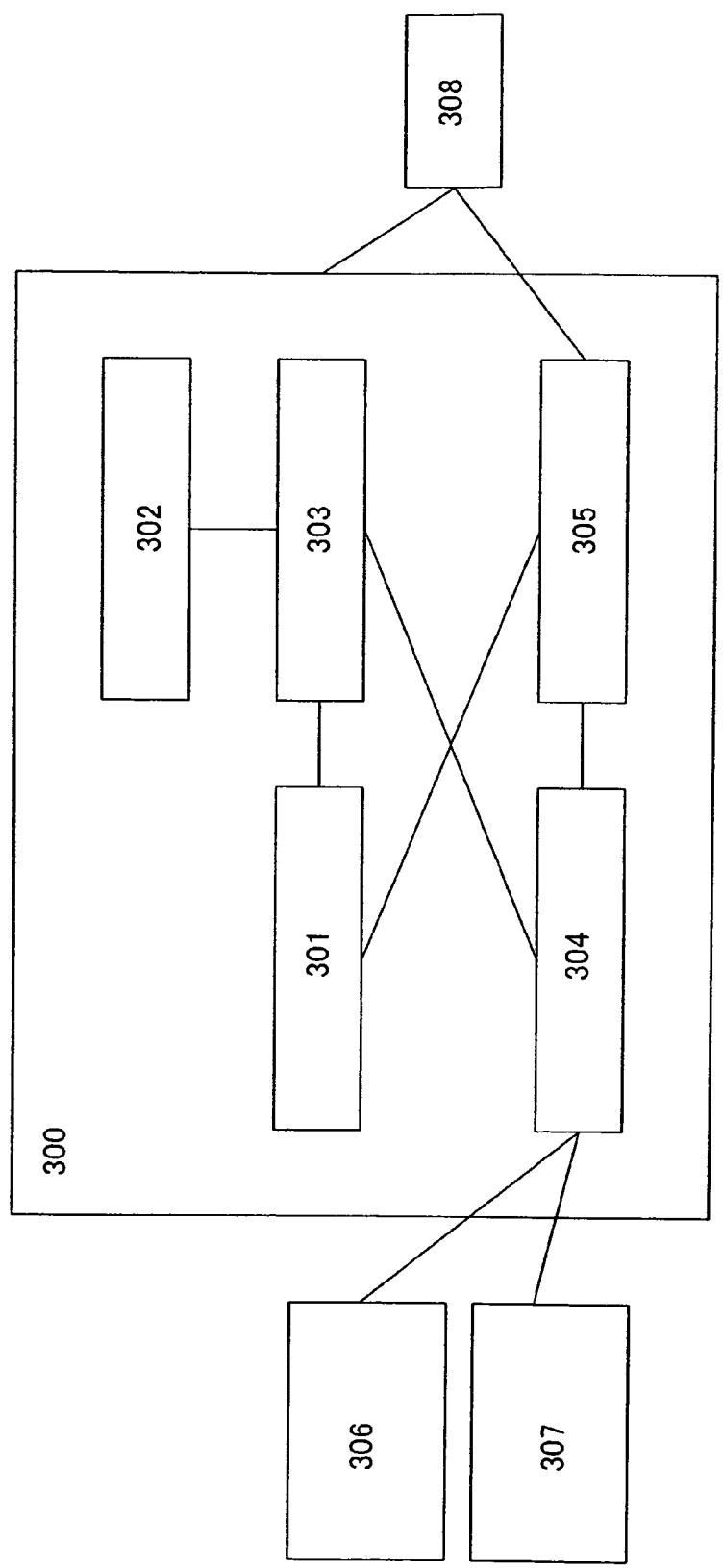
FIG. 6 is a block diagram illustrating a structure of a semiconductor device of the present invention in Embodiment Mode 1.

In FIG. 5, the example is shown in which the short circuit judgment circuit includes the voltage detection circuit. In FIG. 6, a block diagram of an example is shown in which the short circuit judgment circuit includes an electric current detection circuit.

In FIG. 6, a power source control circuit 300 includes a short circuit judgment circuit 301, a timer circuit 302, a selector circuit 303, a power source distribution circuit 304, and an electric current adjustment circuit 305. The short circuit judgment circuit 301 is connected to the selector circuit 303 and the electric current adjustment circuit 305; the selector circuit 303 is connected to the timer circuit 302 and the power source distribution circuit 304; and the power source distribution circuit 304 is connected to the electric current adjustment circuit 305. In addition, the power source distribution circuit 304 is connected to each of the first functional circuit 306 and the second functional circuit 307. The first functional circuit 306 and the second functional circuit 307 correspond to the first functional circuit 103 and the second functional circuit 104 in FIG. 1, respectively.

In general, in order to detect an electric current, a resistive element with a low resistance value is interposed in a path of the electric current, and a potential difference between both sides of the resistive element is detected by an amplifier. In this embodiment mode, a resistive element may be interposed in the pathway of the electric current from a power source circuit to a functional circuit. However, since the electric current adjustment circuit 305 includes a resistive element, whether power source is short-circuited or not is judged in accordance with whether a potential obtained by amplifying a potential difference between both sides of the resistive element included in the electric current adjustment circuit 305 is higher than a pre-set potential or not. In FIG. 6, a line connecting the short circuit judgment circuit 301 and the electric current adjustment circuit 305 includes a wiring for measuring an electric current as well as a wiring for sending a signal for increasing an electric current when power source is judged as being not short-circuited. Resistance for measuring an electric current is not always the same as resistance for adjusting an electric current. In general, in order to detect an electric current, a resistive element with a lower resistance value than that for adjusting an electric current is used to suppress influence on a measuring object. Moreover, when an electric current is adjusted, performance of an amplifier is not needed to be high because a big potential difference can be obtained by using resistance of the electric current adjustment circuit.

Although, in this embodiment mode, the short-circuited power source in the functional circuit is detected when power source is supplied to the semiconductor device, detection can be periodically performed or detection can be started by an external signal.

In this embodiment mode, for example, a memory such as a non-volatile memory can store which functional circuit has short-circuited power source in order to be used in the next time. When RFID turns to be in a state of receiving radio waves again, after a state of receiving no radio waves, power source is supplied. Note that the next time means, for example, a state in which power source is supplied again. In the case where detection is started by the external signal, the next time means a state in which detection is started again by the external signal.

In this embodiment mode, a plurality of functional circuits is not necessary to be perfectly the same. Seen from the outside, although the plurality of functional circuits has logically the same functions, the layout or internal logic can be changed in order to prevent all the plurality of functional circuits from breakdown.

As described above, even if one functional circuit in the redundant circuit has short-circuited power source, the semiconductor device of this embodiment mode can be operated by other functional circuits.

In addition, by employing the structure of the semiconductor device of this embodiment mode, since all the functional circuits do not need to be operated all the time and can be operated one by one, power consumption can be suppressed while redundancy is kept.

In addition, as compared to a conventional structure including a redundant circuit and a majority decision circuit which requires at least three functional circuits, at least two functional circuits are required to achieve redundancy in this embodiment mode. Therefore, if the structure of the functional circuits are the same, a layout area can be smaller than that of the structure including the majority decision circuit.

Moreover, in this embodiment mode, the layout area of the power source control circuit can be smaller than that of the functional circuit having redundancy. Thus, since the power source control circuit can be less likely to be influenced by external force than the functional circuit having redundancy, resistance of the whole semiconductor device to external force can be improved.

Note that the structure of the semiconductor device described in this embodiment mode can be implemented by being combined as appropriate with structures described in other embodiment modes in this specification.

Embodiment Mode 2

In this embodiment mode, an exemplary structure of a semiconductor device which is different from that described in Embodiment Mode 1 will be described with reference to the accompanying drawings.

Figure 7:
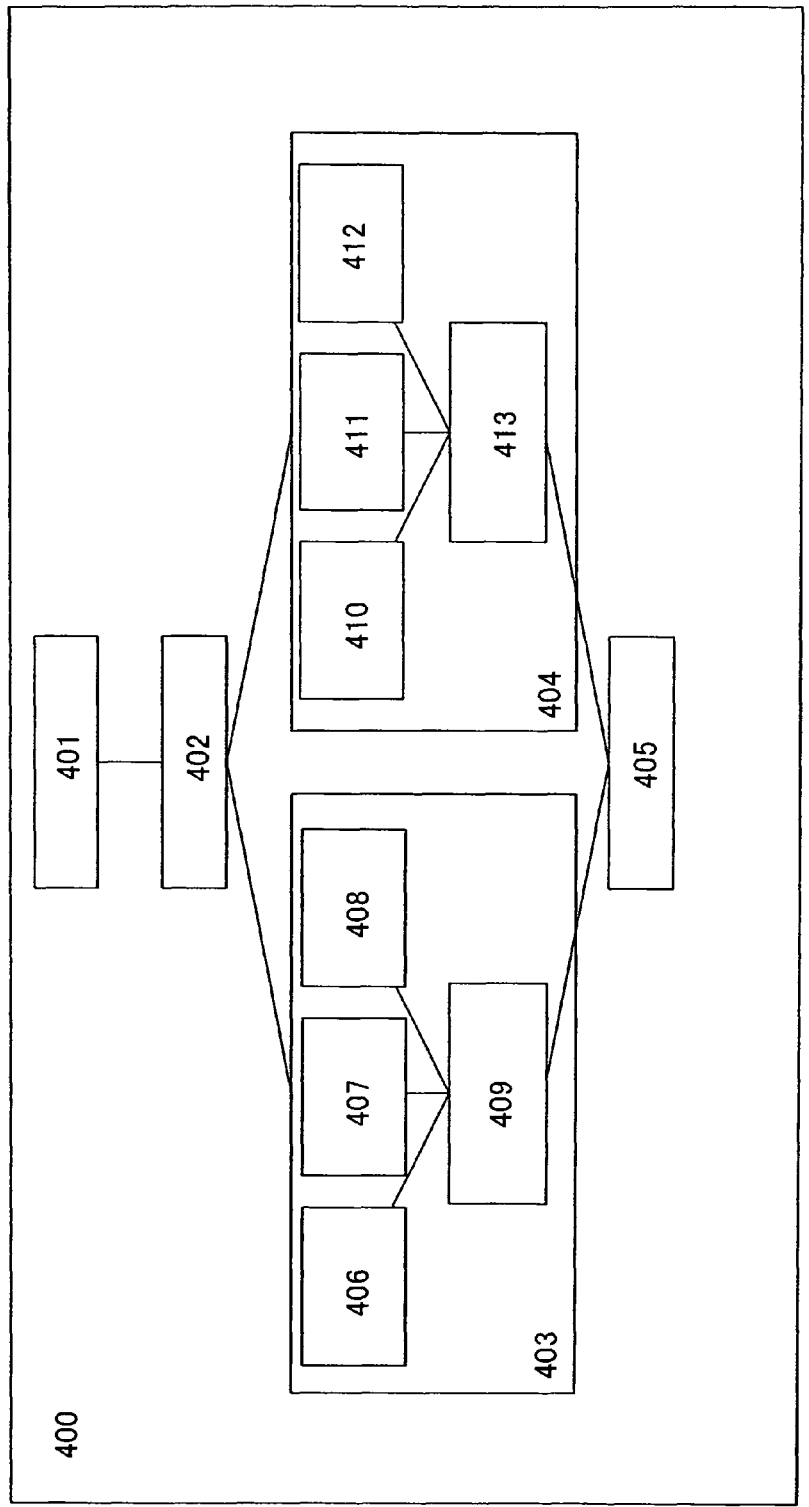
FIG. 7 is a block diagram illustrating a structure of a semiconductor device of the present invention in Embodiment Mode 2.

FIG. 7 is a block diagram illustrating a concept of a semiconductor device in this embodiment mode. A semiconductor device 400 includes a power source circuit 401, a power source control circuit 402, a first redundant circuit 403, a second redundant circuit 404, and a signal selection circuit 405. The power source circuit 401 is connected to the power source control circuit 402; the power source control circuit 402 is connected to the first redundant circuit 403 and the second redundant circuit 404; and the first redundant circuit 403 and the second redundant circuit 404 are connected to the signal selection circuit 405. The first redundant circuit 403 includes a first functional circuit 406, a second functional circuit 407, a third functional circuit 408, and a first majority decision circuit 409; and the second redundant circuit 404 includes a fourth functional circuit 410, a fifth functional circuit 411, a sixth functional circuit 412, and a second majority decision circuit 413. In the first redundant circuit 403, the first functional circuit 406, the second functional circuit 407, and the third functional circuit 408 are connected to the first majority decision circuit 409. In the second redundant circuit 404, the fourth functional circuit 410, the fifth functional circuit 411, and the sixth functional circuit 412 are connected to the second majority decision circuit 413. Note that the first to sixth functional circuits 406 to 412 are circuits having the same functions.

Since the structures of the power source circuit, the power source control circuit, the functional circuits, and the signal selection circuit in Embodiment Mode 1 can be applied to the power source circuit 401, the power source control circuit 402, the first to sixth functional circuits 406 to 412, and the signal selection circuit 405, respectively, description thereof is omitted here.

Operation of the semiconductor device in this embodiment mode will be described. The power source control circuit 402 to which power source is input from the power source circuit 401 supplies power source to the first redundant circuit 403. Then, the power source control circuit 402 judges whether short-circuited power source is found between each of the first to third functional circuits 406 to 408 and the first majority decision circuit 409. When short-circuited power source is found, power source supply to the first redundant circuit 403 stops and power source supply to the second redundant circuit 404 starts. From output signals from the first majority decision circuit 409 and the second majority decision circuit 413, the signal selection circuit 405 selects the one which is supplied with power source.

As described above, in this embodiment mode, by providing a majority decision circuit for each redundant circuit, even if one of the plurality of redundant circuits outputs an abnormal value, a normal value can be output from the majority decision circuit by using other redundant circuits. Further, by providing a plurality of redundant circuits and a power source control circuit, even if one of the plurality of redundant circuits has short-circuited power source, operation can be performed by other redundant circuits. Therefore, since operation can be performed even if part of the semiconductor device is broken by external force, reliability is improved.

Moreover, by employing the structure described in this embodiment mode, a defect that causes incapableness of judging short-circuited power source which occurs in a manufacturing step of a semiconductor can be avoided.

Embodiment Mode 3

Note that this embodiment mode can be combined with other embodiment modes as appropriate. In this embodiment mode, a semiconductor device which performs data communication through wireless communication of the present invention will be described with reference to the accompanying drawings.

Figure 8:
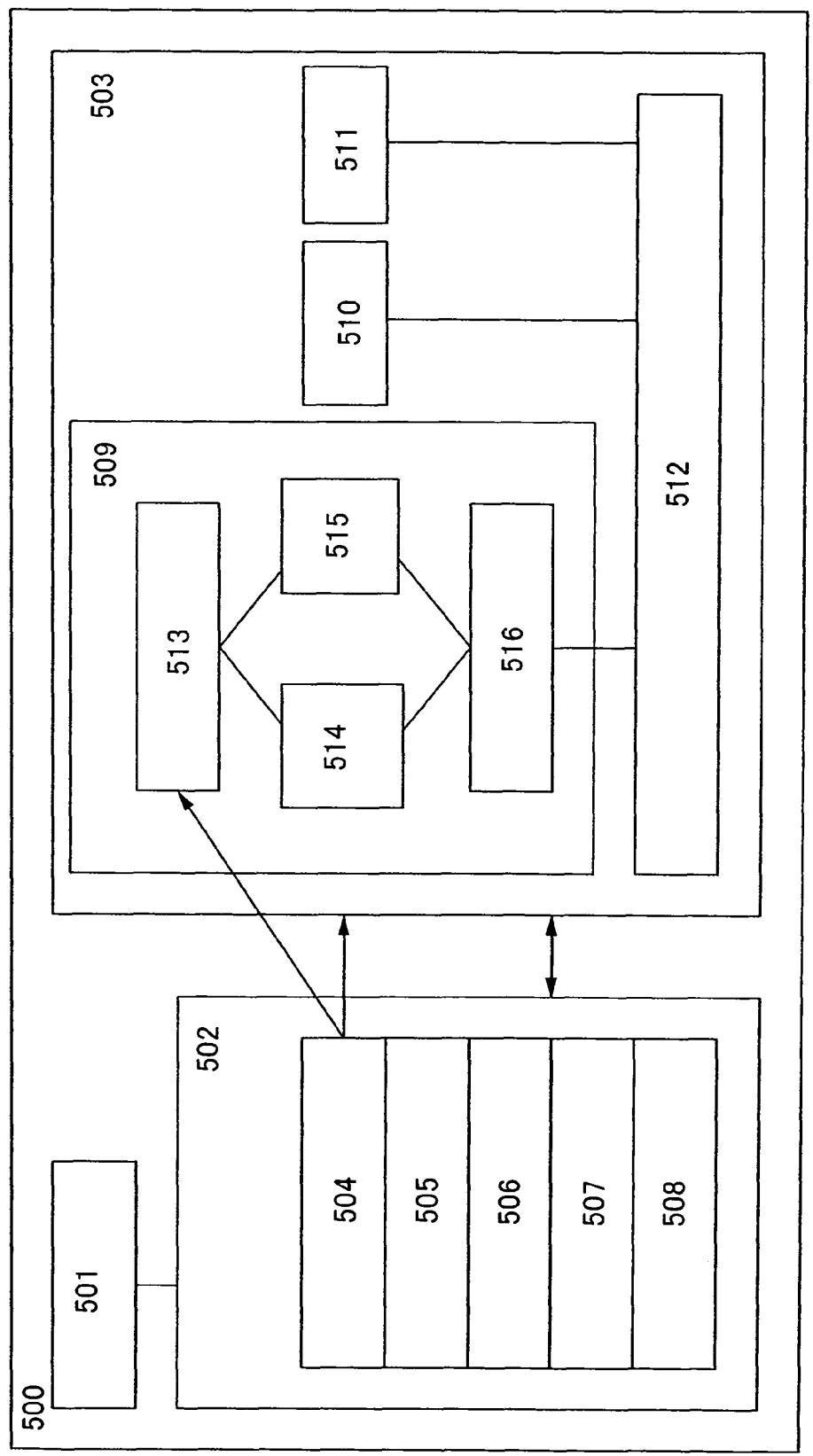
FIG. 8 is a block diagram illustrating a structure of a semiconductor device of the present invention in Embodiment Mode 3.

FIG. 8 is a block diagram illustrating a structure of RFID of the present invention in this embodiment mode. In this embodiment mode, an example is shown in which two CPUs (also referred to as a central arithmetic device or a central arithmetic circuit) are mounted as functional circuits.

A semiconductor device 500 shown in this embodiment mode includes an antenna portion 501, an analog portion 502, and a logic portion 503.

The analog portion 502 includes a power source circuit 504, a reset circuit 505, a clock generation circuit 506, a demodulation circuit 507, and a modulation circuit 508. The logic portion 503 includes a ROM (read only memory) 510, a RAM (random access memory) 511, a controller 512, and an arithmetic circuit portion 509. The arithmetic circuit portion 509 includes a power source control circuit 513, a first CPU 514, a second CPU 515, and a signal selection circuit 516.

Power source generated by the power source circuit 504 in the analog portion 502 is supplied to the analog portion 502 including the clock generation circuit and the like, and the logic portion 503. The first CPU 514 and the second CPU 515 are supplied with power source through the power source control circuit 513. The controller 512 includes a CPU interface circuit and has a function of outputting a demodulated communication signal to the arithmetic circuit portion 509 and outputting data output from the arithmetic circuit portion 509 to the modulation circuit 508. In the arithmetic circuit portion 509, whether there is short-circuited power source in the first CPU 514 and the second CPU 515 is detected. In the case where one CPU has short-circuited power source, the arithmetic circuit portion 509 can switch one CPU to the other CPU. In that case, the first CPU 514 and the second CPU 515 do not operate at the same time.

Next, operation of the semiconductor device in this embodiment mode will be described. First, when the semiconductor device 500 is supplied with power source, the semiconductor device 500 receives a signal by a signal transmitted from an external communication device.

In FIG. 8 which illustrates this embodiment mode, although an example is shown in which two CPUs are provided as the functional circuits, the number of the CPUs is not limited to two. In this embodiment mode, in the case where power source in the provided CPUs is judged as being short-circuited, the power source control circuit stops in a state in which no power source is supplied to all the CPUs. Among the functional circuits with short-circuited power source, the functional circuit with the highest voltage, that is, the functional circuit with the smallest amount of electric current due to short-circuited power source may be selected again; however, in actual breakdown, the amount of electric current due to short-circuited power source is likely to be almost the same regardless of patterns of breakdown. In order to reduce the possibility of breakdown of the power source control circuit 513, the power source control circuit 513 preferably has simple functions and a small layout.

In the arithmetic circuit portion 509, at first, power source is supplied to the power source control circuit 513. Then, system reset is released and operation goes on to the following Selector Change. Immediately after the semiconductor device 500 is supplied with power source, that is, almost at the same time when the semiconductor device 500 is supplied with power source without distinguishing a specific state such as Start state or Selector Change state, a value of a selector may be determined and the first CPU 514 may be supplied with power source. However, in this embodiment mode, the first CPU 514 is preferably not supplied with power source at the same time in order to fix a condition for judging whether power source is short-circuited or not.

In Selector Change state immediately after Start state, the value of the selector is set to be 1 in the power source control circuit 513, and the first CPU 514 is supplied with power source for judging short-circuited power source.

When a power supply potential of the first CPU 514 becomes equal to or higher than a pre-set value during a certain amount of time, power source is judged as being not short-circuited. If power source is not short-circuited, operation goes on to Finish state. Operation may go on to Finish state immediately after the power source potential of the first CPU 514 or the second CPU 515 becomes equal to or higher than a certain value, or after waiting for a pre-set certain time.

On the other hand, if the power source potential of the first CPU 514 does not become equal to or higher than a certain value during a certain amount of time, power source of the first CPU 514 is judged as being short-circuited and operation goes back to Selector Change state. In Selector Change state, the value of the selector is set to be 2 by adding 1, and the second CPU 515 is supplied with power source for judgment of short-circuited power source. This embodiment mode shows the example in which two CPUs are provided. In the case where three or more CPUs are provided, similar judging operation is repeated in each CPU to find a CPU without short-circuited power source.

After the power source is judged as being not short-circuited, an electric current to the selected CPU is increased. Then, a reset release signal is transmitted to the selected CPU, so that the power source control circuit 513 stops operation by itself. Note that stopping operation means not changing a state of each node in the power source control circuit 513.

The signal selection circuit 516 to which a signal is input from the first CPU 514 or the second CPU 515 controls a signal which is input/output. In this embodiment mode, output from respective CPUs can be performed by a wired OR (NOR) circuit with an open drain. Alternatively, the output signal can be selected by a logic circuit by using a selection signal of the power source control circuit 513. An input signal can be directly input to each functional circuit from the controller 512.

An access is performed to ROM 510 and RAM 511 through a memory controller in the controller 512 by using a signal input to the CPU interface in the controller 512 from the analog portion. Arithmetic processing is performed by the first CPU 514 or the second CPU 515 and transmit data is generated after input/output of data in the ROM 510 and the RAM 511, and modulated in the modulated circuit 508, and then a transmit signal is transmitted from the antenna portion 501 to the wireless communication device.

As described above, even if one of the plurality of redundant circuits has short-circuited power source, the semiconductor device of this embodiment mode can be operated by other redundant circuits.

In addition, by employing the structure of the semiconductor device of this embodiment mode, since all the redundant circuits do not need to be operated all the time and can be operated one by one, power consumption can be suppressed while redundancy is kept.

Embodiment Mode 4

In this embodiment mode, an example of a manufacturing method of the semiconductor device described in the above embodiment modes will be described with reference to partial cross-sectional views.

In this embodiment mode, one example of a manufacturing method for the semiconductor device described in the above embodiment modes will be described. In this embodiment mode, a structure in which a semiconductor device including an antenna circuit is provided over the same substrate will be described.

Figure 9A:
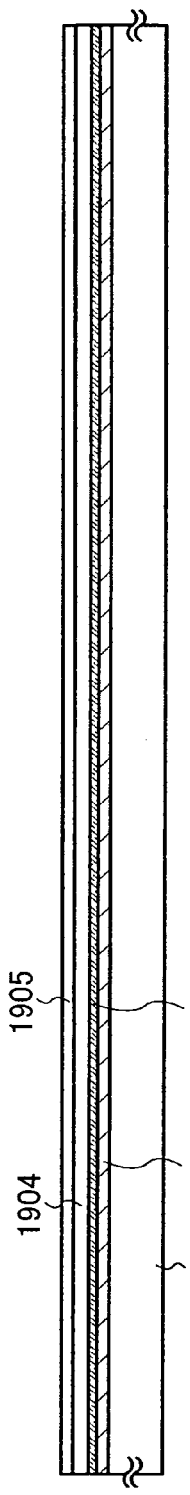
FIGS. 9A to 9D are cross-sectional views of a manufacturing method of a semiconductor device of the present invention in Embodiment Mode 4.

First, as shown in FIG. 9A, a separation layer 1903 is formed over the entire surface of a substrate 1901 with an insulating film 1902 interposed therebetween, and then an insulating film 1904 functioning as a base film and a semiconductor film 1905 (e.g., a film containing amorphous silicon) are formed thereover. Note that the insulating film 1902, the separation layer 1903, the insulating film 1904, and the semiconductor film 1905 can be formed consecutively.

The substrate used for the substrate 1901 is selected from a glass substrate, a quartz substrate, a ceramic substrate, a metal substrate (e.g., a stainless steel substrate), or a semiconductor substrate (e.g., a silicon substrate). Alternatively, a plastic substrate made of polyethylene terephthalate (PET), polyethylene naphthalate (PEN), polyether sulfone (PES), acrylic, or the like can be selected. In this step, although the separation layer 1903 is provided over the entire surface of the substrate 1901 with the insulating film 1902 interposed therebetween, the separation layer can also be provided as selected by a photolithography method after being provided over the entire surface of the substrate 1901.

The insulating films 1902 and 1904 are formed using a material such as silicon oxide, silicon nitride, silicon oxynitride (SiOxNy, where x>y>0), or silicon nitride oxide (SiNxOy, where x>y>0) by a CVD method, a sputtering method, or the like. For example, when each of the insulating films 1902 and 1904 is formed to have a two-layer structure, a silicon nitride oxide film may be formed as a first insulating film and a silicon oxynitride film may be formed as a second insulating film. In addition, a silicon nitride film may be formed as a first insulating film and a silicon oxide film may be formed as a second insulating film. The insulating film 1902 functions as a blocking layer which prevents an impurity element contained in the substrate 1901 from being mixed into the separation layer 1903 or elements formed thereover. The insulating film 1904 functions as a blocking layer which prevents an impurity element contained in the substrate 1901 or the separation layer 1903 from being mixed into elements formed over the insulating film 1904. In this manner, by providing the insulating films 1902 and 1904 which function as the blocking layers, an alkali metal such as Na or an alkaline earth metal, contained in the substrate 1901, and an impurity element contained in the separation layer 1903 can be prevented from adversely affecting the element formed over the insulating film 1904. Note that, when quartz is used for the substrate 1901, for example, the insulating films 1902 and 1904 may be omitted.

The separation layer 1903 may be formed using a metal film, a stacked structure of a metal film and a metal oxide film, or the like. As a metal film, either a single layer or stacked layers of a film formed using an element selected from tungsten (W), molybdenum (Mo), titanium (Ti), tantalum (Ta), niobium (Nb), nickel (Ni), cobalt (Co), zirconium (Zr), zinc (Zn), ruthenium (Ru), rhodium (Rh), palladium (Pd), osmium (Os), and iridium (Ir), or a film formed using an alloy material or a compound material containing the element as its main component. In addition, such materials can be formed by a sputtering method, various CVD methods such as a plasma CVD method, or the like. A stacked structure of a metal film and a metal oxide film can be obtained by the steps of forming the above-described metal film and applying plasma treatment thereto under an oxygen atmosphere or a nitrogen oxide atmosphere or applying heat treatment thereto under an oxygen atmosphere or a nitrogen oxide atmosphere, and thereby forming oxide or oxynitride of the metal film on the metal film. For example, when a tungsten film is provided as a metal film by a sputtering method, a CVD method, or the like, a metal oxide film made of tungsten oxide can be formed on the surface of the tungsten film by applying plasma treatment to the tungsten film. In addition, for example, after a metal film (e.g., tungsten) is formed, an insulating film formed of silicon oxide or the like may be formed over the metal film by a sputtering method, and also metal oxide (e.g., tungsten oxide over tungsten) may be formed over the metal film. Moreover, the above-described high-density plasma treatment may be applied as the plasma treatment, for example. Besides, metal nitride or metal oxynitride may also be formed. In that case, plasma treatment or heat treatment may be applied to the metal film under a nitrogen atmosphere or under an atmosphere containing nitrogen and oxygen.

The semiconductor film 1905 is formed to a thickness of greater than or equal to 25 nm and less than or equal to 200 nm (preferably, greater than or equal to 30 nm and less than or equal to 150 nm) by a sputtering method, an LPCVD method, a plasma CVD method, or the like.

Figure 9B:
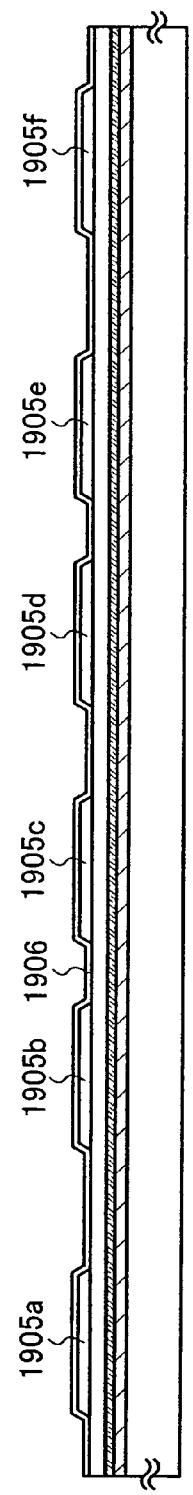

Next, as shown in FIG. 9B, the semiconductor film 1905 is crystallized by laser beam irradiation. Note that the crystallization of the semiconductor film 1905 may also be conducted by a method combining the laser crystallization with a thermal crystallization method using RTA or an annealing furnace or with a thermal crystallization method using a metal element that promotes the crystallization, or the like. After that, the crystallized semiconductor film is etched into desired shapes, whereby crystalline semiconductor films 1905*a* to 1905*f* are formed. Then, a gate insulating film 1906 is formed so as to cover the semiconductor films 1905*a* to 1905*f*.

The gate insulating film 1906 is formed using a material such as silicon oxide, silicon nitride, silicon oxynitride, or silicon nitride oxide by a CVD method, a sputtering method, or the like. For example, when the gate insulating film 1906 is formed to have a two-layer structure, it is preferable to form a silicon oxynitride film as a first insulating film and a silicon nitride oxide film as a second insulating film. Alternatively, it is also preferable to form a silicon oxide film as a first insulating film and a silicon nitride film as a second insulating film.

An example of a manufacturing process of the crystallized semiconductor films 1905*a* to 1905*f* is briefly described below. First, an amorphous semiconductor film with a thickness of greater than or equal to 50 nm and less than or equal to 60 nm is formed by a plasma CVD method. Then, a solution containing nickel which is a metal element used to promote crystallization is made to be retained on the amorphous semiconductor film, which is followed by dehydrogenation treatment (at 500° C. for one hour) and thermal crystallization treatment (at 550° C. for four hours). In this way, a crystalline semiconductor film is formed. Then, the crystalline semiconductor film is irradiated with a laser beam by a photolithography method and etched so that the crystalline semiconductor films 1905*a* to 1905*f* are formed. Note that crystallization of the amorphous semiconductor film may be conducted using laser beam irradiation only, without performance of thermal crystallization which uses a metal element that promotes crystallization.

As a laser beam used for crystallization, either a continuous wave laser (a CW laser) or a pulsed laser can be used. As a laser that can be used here, there are gas lasers such as an Ar laser, a Kr laser, and an excimer laser; a laser in which single-crystalline YAG, YVO$_4$, forsterite (Mg$_2$SiO$_4$), YAlO$_3$, or GdVO$_4$ or polycrystalline (ceramic) YAG, Y$_2$O$_3$, YVO$_4$, YAlO$_3$, or GdVO$_4$ is doped with one or more laser media selected from among Nd, Yb, Cr, Ti, Ho, Er, Tm, and Ta as dopant; a glass laser; a ruby laser; an alexandrite laser; a Ti:sapphire laser; a copper vapor laser; and a metal vapor laser. When irradiation is conducted with the fundamental wave of such a laser beam or the second to fourth harmonics of the fundamental wave, crystals with a large grain size can be obtained. For example, the second harmonic (532 nm) or the third harmonic (355 nm) of an Nd:YVO$_4$ laser (the fundamental wave of 1064 nm) can be used. In this case, a laser power density of about greater than or equal to 0.01 MW/cm$^2$ and less than or equal to 100 MW/cm$^2$ (preferably, greater than or equal to 0.1 MW/cm$^2$ and less than or equal to 10 MW/cm$^2$) is required, and irradiation is conducted with a scanning rate of about greater than or equal to 10 cm/sec and less than or equal to 2000 cm/sec. Note that the laser in which single-crystalline YAG, YVO$_4$, forsterite (Mg$_2$SiO$_4$), YAlO$_3$, or GdVO$_4$ or polycrystalline (ceramic) YAG, Y$_2$O$_3$, YVO$_4$, YAlO$_3$, or GdVO$_4$ is doped with one or more laser media selected from among Nd, Yb, Cr, Ti, Ho, Er, Tm, and Ta as dopant; an Ar laser, or a Ti:sapphire laser can be used as a CW laser, whereas they can also be used as pulsed laser with a repetition rate of 10 MHz or more by being combined with mode locking. When a laser beam with a repetition rate of 10 MHz or more is used, it is possible for a semiconductor film to be irradiated with the next pulse after during the period in which the semiconductor film is melted by the previous laser and solidified. Therefore, unlike the case of using a pulsed laser with a low repetition rate, a solid-liquid interface in the semiconductor film can be continuously moved. Thus, crystal grains which have grown continuously in the scanning direction can be obtained.

The gate insulating film 1906 may be formed by oxidization or nitridation of the surfaces of the semiconductor films 1905*a* to 1905*f* by the above-described high-density plasma treatment. For example, plasma treatment with a mixed gas of a rare gas such as He, Ar, Kr, or Xe, and oxygen, nitrogen oxide, ammonia, nitrogen, or hydrogen is used. When plasma is excited by the introduction of microwaves, plasma with a low electron temperature and a high electron density can be generated. With oxygen radicals (which may include OH radicals) or nitrogen radicals (which may include NH radicals) which are generated by the high-density plasma, the surfaces of the semiconductor films can be oxidized or nitrided.

By such high-density plasma treatment, an insulating film with a thickness of greater than or equal to 1 nm and less than or equal to 20 nm, typically greater than or equal to 5 nm and less than or equal to 10 nm, is formed on the semiconductor films. Since the reaction in this case is a solid-phase reaction, interface state density between the insulating film and the semiconductor films can be quite low. Since such high-density plasma treatment directly oxidizes (or nitrides) the semiconductor films (crystalline silicon or polycrystalline silicon), the insulating film can be formed to have a thickness with extremely little unevenness. In addition, since crystal grain boundaries of crystalline silicon are not strongly oxidized, an excellent state results. That is, by the solid-phase oxidation of the surfaces of the semiconductor films by high-density plasma treatment which is described in this embodiment mode, an insulating film with an uniform thickness and low interface state density can be formed without excessive oxidation reaction at the crystal grain boundaries.

As the gate insulating film 1906, an insulating film only formed by high-density plasma treatment may be used, or a stacked layer which is obtained by depositing an insulating film formed of at least one of silicon oxide, silicon oxynitride, and silicon nitride on the insulating film by a CVD method using plasma or thermal reaction may be used. In either case, the amount of variation in characteristics of transistors which each include an insulating film formed by high-density plasma treatment as part or all of its gate insulating film can be reduced.

In addition, the semiconductor films 1905*a* to 1905*f*, which are obtained by irradiation of a semiconductor film with a continuous wave laser beam or a laser beam oscillated with a repetition rate of 10 MHz or more and scanning of the semiconductor film in one direction to crystallize the semiconductor film, have a characteristic in that their crystals grows in the beam scanning direction. A transistor is arranged so that its channel length direction (direction in which carriers move when a channel formation region is formed) is aligned with the scanning direction, and the above-described gate insulating film 1906 is combined with the semiconductor film, so that a thin film transistor (TFT) with high electron field-effect mobility and few variations in characteristics can be obtained.

Next, a first conductive film and a second conductive film are stacked over the gate insulating film 1906. Here, the first conductive film is formed to have a thickness of greater than or equal to 20 nm and less than or equal to 100 nm by a CVD method, a sputtering method, or the like. The second conductive film is formed to have a thickness of greater than or equal to 100 nm and less than or equal to 400 nm. The first conductive film and the second conductive film are each formed of an element selected from among tantalum (Ta), tungsten (W), titanium (Ti), molybdenum (Mo), aluminum (Al), copper (Cu), chromium (Cr), niobium (Nb), and the like, or an alloy material or a compound material containing the element as its main component. Alternatively, the first conductive film and the second conductive film are formed of a semiconductor material typified by polycrystalline silicon doped with an impurity element such as phosphorus. As examples of combinations of the first conductive film and the second conductive film, a tantalum nitride film and a tungsten film; a tungsten nitride film and a tungsten film; a molybdenum nitride film and a molybdenum film; and the like can be given. Tungsten and tantalum nitride have high heat resistance. Therefore, after forming the first conductive film and the second conductive film, thermal treatment can be applied thereto for the purpose of heat activation. In addition, in the case where not a two-layer structure but a three-layer structure is employed, it is preferable to employ a stacked structure of a molybdenum film, an aluminum film, and another molybdenum film.

Next, a resist mask is formed by a photolithography method, and etching treatment for forming gate electrodes and gate lines is performed. Thus, gate electrodes 1907 are formed above the semiconductor films 1905a to 1905f. Here, a stacked structure of a first conductive film 1907a and a second conductive film 1907b is shown as an example of the gate electrode 1907.

Figure 9C:
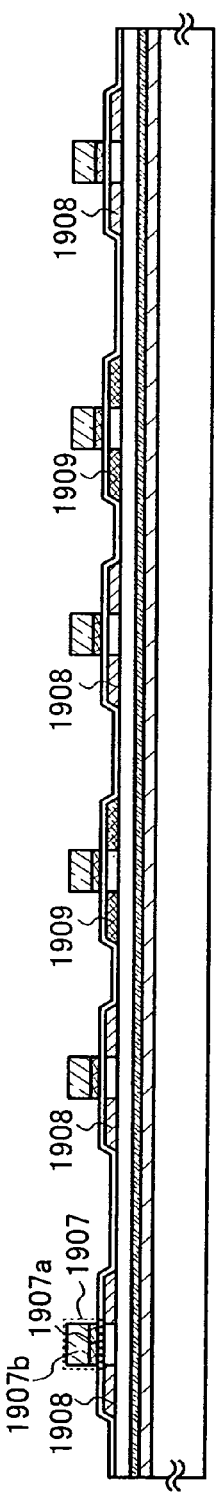

Next, as shown in FIG. 9C, the semiconductor films 1905a to 1905f are doped at a low concentration with an impurity element which imparts n-type conductivity, using the gate electrodes 1907 as masks, by an ion doping method or an ion implantation method. Then, a resist mask is formed as selected by a photolithography method, and any of the semiconductor films 1905a to 1905f are doped at high concentration with an element which imparts p-type conductivity. As an impurity element which imparts n-type conductivity, phosphorus (P), arsenic (As), or the like can be used. As an impurity element which imparts p-type conductivity, boron (B), aluminum (Al), gallium (Ga), or the like can be used. Here, phosphorus (P) is used as an impurity element which imparts n-type conductivity and is introduced as selected into the semiconductor films 1905a to 1905f so that phosphorus (P) is contained at concentrations of greater than or equal to $1\times10^{15}/$cm$^3$ and less than or equal to $1\times10^{19}/$cm$^3$. Thus, n-type impurity regions 1908 are formed. In addition, boron (B) is used as an impurity element which imparts p-type conductivity and is introduced as selected into the semiconductor films 1905c and 1905e so as to be contained at concentrations of greater than or equal to $1\times10^{19}/$cm3 and less than or equal to $1\times10^{20}/$cm$^3$. Thus, p-type impurity regions 1909 are formed.

Subsequently, an insulating film is formed so as to cover the gate insulating film 1906 and the gate electrodes 1907. The insulating film is formed to be either a single layer or a stacked layer of at least one of a film containing an inorganic material such as silicon, silicon oxide, or silicon nitride or a film containing an organic material such as an organic resin by a plasma CVD method, a sputtering method, or the like. Next, the insulating film is etched as selected by anisotropic etching mainly in the perpendicular direction so that insulating films 1910 (also referred to as sidewalls) which are in contact with the side surfaces of the gate electrodes 1907 are formed. The insulating films 1910 are used as doping masks for forming LDD (lightly doped drain) regions.

Next, the semiconductor films 1905a, 1905b, 1905d, and 1905f are doped with an impurity element which imparts n-type conductivity at high concentration, using the resist mask formed by a photolithography method, the gate electrodes 1907, and the insulating films 1910 as masks. Thus, n-type impurity regions 1911 are formed. Here, phosphorus (P) is used as an impurity element which imparts n-type conductivity, and is introduced as selected into the semiconductor films 1905a, 1905b, 1905d, and 1905f so as to be contained at concentrations of greater than or equal to $1\times10^{19}/$cm$^3$ and less than or equal to $1\times10^{20}/$cm$^3$. Thus, the n-type impurity regions 1911 with a higher concentration of impurity than that of the impurity regions 1908 are formed.

Figure 9D:
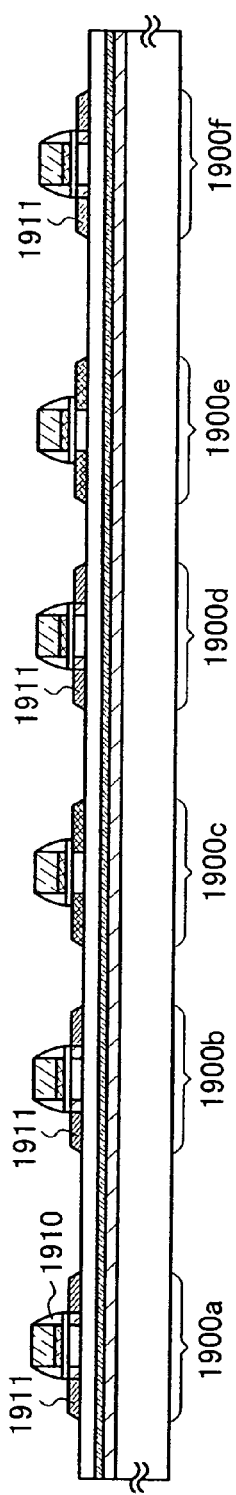

Through the above-described steps, as shown in FIG. 9D, n-channel thin film transistors 1900a, 1900b, 1900d, and 1900f; and p-channel thin film transistors 1900c and 1900e are formed.

In the thin film transistor 1900a, a channel formation region is formed in a region of the semiconductor film 1905a which overlaps with the gate electrode 1907; the impurity region 1911 which forms a source or drain region is formed in a region of the semiconductor film 1905a which does not overlap with the gate electrode 1907 and the insulating film 1910; and a low concentration impurity region (LDD region) is formed in a region which overlaps with the insulating film 1910 and between the channel formation region and the impurity region 1911. In addition, channel formation regions, low concentration impurity regions, and the impurity regions 1911 are formed in the thin film transistors 1900b, 1900d, and 1900f.

In the thin film transistor 1900c, a channel formation region is formed in a region of the semiconductor film 1905c which overlaps with the gate electrode 1907, and the impurity region 1909 which forms a source or drain region is formed in a region which does not overlap with the gate electrode 1907. Similarly, a channel formation region and the impurity region 1909 are formed in the p-channel thin film transistor 1900e. Here, although LDD regions are not formed in the thin film transistors 1900c and 1900e, LDD regions may be provided in the thin film transistors or a structure without LDD regions may be applied to the thin film transistors 1900a and 1900b.

Next, as shown in FIG. 10A, an insulating film with a single layer or stacked layers is formed so as to cover the semiconductor films 1905a to 1905f, the gate electrodes 1907, and the like. Then, a conductive film 1913 electrically connected to the impurity regions 1909 and 1911 which form the source and drain regions of the thin film transistors 1900a to 1900f is formed over the insulating film. The insulating film is formed either in a single layer or in stacked layers, using one or more of an inorganic material such as silicon oxide or silicon nitride, an organic material such as polyimide, polyamide, benzocyclobutene, acrylic, or epoxy, a siloxane material, or the like by a CVD method, a sputtering method, an SOG method, a droplet discharging method, a screen printing method, or the like. Here, the insulating film is formed to have two layers such that a first insulating film 1912a is formed of a silicon nitride oxide film and a second insulating film 1912b is formed of a silicon oxynitride film. In addition, the conductive film 1913 can form the source and drain electrodes of the semiconductor films 1905a to 1905f.

Note that before the insulating films 1912a and 1912b are formed or after one or both of them is/are formed, heat treatment is preferably applied for recovery of the crystallinity of the semiconductor films, activation of the impurity element which has been added into the semiconductor films, or hydrogenation of the semiconductor films. As the heat treatment, thermal annealing, laser annealing, RTA, or the like is preferably applied.

The conductive film 1913 is formed of either a single layer or a stacked layer of an element selected from among aluminum, tungsten, titanium, tantalum, molybdenum, nickel, platinum, copper, gold, silver, manganese, neodymium, carbon, and silicon, or an alloy material or a compound material containing the element as its main component by a CVD method, a sputtering method, or the like. An alloy material containing aluminum as its main component corresponds to, for example, a material which contains aluminum as its main component and also contains nickel, or a material which contains aluminum as its main component and also contains nickel and one or both of carbon and silicon. The conductive film 1913 is preferably formed to have a stacked structure of a barrier film, an aluminum-silicon (Al—Si) film, and a barrier film or a stacked structure of a barrier film, an aluminum silicon (Al—Si) film, a titanium nitride film, and a barrier film. Note that the "barrier film" corresponds to a thin film formed of titanium, titanium nitride, molybdenum, or molybdenum nitride. Aluminum and aluminum silicon are the most suitable material for forming the conductive film 1913 because they have low resistance value and are inexpensive. When barrier layers are provided in the top layer and the bottom layer, generation of hillocks of aluminum or aluminum silicon can be prevented. In addition, when a barrier film formed of titanium which is an element having a high reducing property is formed, even when there is a thin natural oxide film formed on the crystalline semiconductor film, the natural oxide film can be chemically reduced, and a favorable contact between the conductive film 1913 and the crystalline semiconductor film can be obtained.

Next, an insulating film 1914 is formed so as to cover the conductive film 1913, and conductive films 1915a and 1915b electrically connected to the conductive film 1913 which forms the source electrode or the drain electrode of each of the semiconductor films 1905a and 1905f are formed over the insulating film 1914. In addition, conductive films 1916a and 1916b electrically connected to the conductive film 1913 which forms the source electrode or the drain electrode of each of the semiconductor films 1905b and 1905e are formed. Note that the conductive films 1915a and 1915b and the conductive films 1916a and 1916b may be formed using the same material at the same time. The conductive films 1915a and 1915b and the conductive films 1916a and 1916b may be formed using any of the above-described materials which can be used for the conductive film 1913.

Subsequently, as shown in FIG. 10B, conductive films 1917a and 1917b functioning as antennas are formed so as to be electrically connected to the conductive films 1916a and 1916b, respectively.

The insulating film 1914 can be formed of either a single layer or a stacked structure of an insulating film containing oxygen or nitrogen such as silicon oxide, silicon nitride, silicon oxynitride, or silicon nitride oxide; a film containing carbon such as DLC (diamond-like carbon); an organic material such as epoxy, polyimide, polyamide, polyvinyl phenol, benzocyclobutene, or acrylic; a siloxane material containing a siloxane resin; or the like by a CVD method, a sputtering method, or the like. Note that a siloxane material corresponds to a material that has a bond of Si—O—Si. Siloxane has a skeleton structure with a bond of silicon (Si) and oxygen (O). As a substituent of siloxane, an organic group containing at least hydrogen (e.g., an alkyl group or aromatic hydrocarbon)

is used. Alternatively, a fluoro group may be used as the substituent. Further alternatively, both a fluoro group and an organic group containing at least hydrogen may be used as the substituent.

The conductive films 1917a and 1917b can be formed of a conductive material by a CVD method, a sputtering method, a printing method such as screen printing or gravure printing, a droplet discharging method, a dispensing method, a plating method, or the like. The conductive films 1917a and 1917b are formed of a single layer or a stacked structure of an element selected from among aluminum (Al), titanium (Ti), silver (Ag), copper (Cu), gold (Au), platinum (Pt), nickel (Ni), palladium (Pd), tantalum (Ta), and molybdenum (Mo) or an alloy material or a compound material containing the element as its main component.

For example, when the conductive films 1917a and 1917b functioning as antennas are formed by a screen printing method, the antenna can be provided by printing a conductive paste as selected in which conductive particles with a grain diameter of several nanometers to several tens of micrometers are dissolved or dispersed in an organic resin. The conductive particles can be at least one of metal particles selected from among silver, gold, copper, nickel, platinum, palladium, tantalum, molybdenum, and titanium; fine particles of silver halide; and dispersive nanoparticles. In addition, the organic resin included in the conductive paste can be one or more of organic resins which function as a binder, a solvent, a dispersing agent, or a coating material for the metal particles. Typically, an organic resin such as an epoxy resin and a silicone resin can be given as examples. In addition, when forming a conductive film, baking is preferably performed after the conductive paste is applied. For example, in the case of using fine particles (e.g., particles with a grain diameter of greater than or equal to 1 nm and less than or equal to 100 nm) containing silver as its main component as a material of the conductive paste, the conductive paste is baked and hardened at temperatures in the range of greater than or equal to 150° C. and less than or equal to 300° C. to obtain the conductive film. Alternatively, it is also possible to use fine particles containing solder or lead-free solder as the main component. In that case, fine particles with a grain diameter of 20 μm or less are preferably used. Solder and lead-free solder have the advantage of being low in cost.

Next, as shown in FIG. 10C, after an insulating film 1918 is formed so as to cover the conductive films 1917a and 1917b, layers including the thin film transistors 1900a to 1900f, the conductive films 1917a and 1917b, and the like (hereinafter referred to as an "element formation layer 1919") are separated from the substrate 1901. Here, after opening portions are formed in regions excluding the region of the thin film transistors 1900a to 1900f by laser beam irradiation (e.g., irradiation with UV light), the element formation layer 1919 can be separated from the substrate 1901 using physical force. The separation layer 1903 may be removed as selected by introduction of an etchant into the opening portions before the element formation layer 1919 is separated from the substrate 1901. As the etchant, a gas or a liquid containing halogen fluoride or a halogen compound is used. For example, when chlorine trifluoride (ClF$_3$) is used as the gas containing halogen fluoride, the element formation layer 1919 can be separated from the substrate 1901. Note that the whole separation layer 1903 is not removed but part thereof may be left behind. Accordingly, the amount of etchant used can be reduced and process time for removing the separation layer can be shortened. In addition, even after the separation layer 1903 is removed, the element formation layer 1919 can be maintained over the substrate 1901. In addition, by reuse of the substrate 1901 from which the element formation layer 1919 has been separated, cost reduction can be achieved.

The insulating film 1918 can be formed of either a single layer or a stacked structure of an insulating film containing oxygen or nitrogen such as silicon oxide, silicon nitride, silicon oxynitride, or silicon nitride oxide; a film containing carbon such as DLC (diamond-like carbon); an organic material such as epoxy, polyimide, polyamide, polyvinyl phenol, benzocyclobutene, or acrylic; a siloxane material containing a siloxane resin; or the like by a CVD method, a sputtering method, or the like.

Figure 11A:
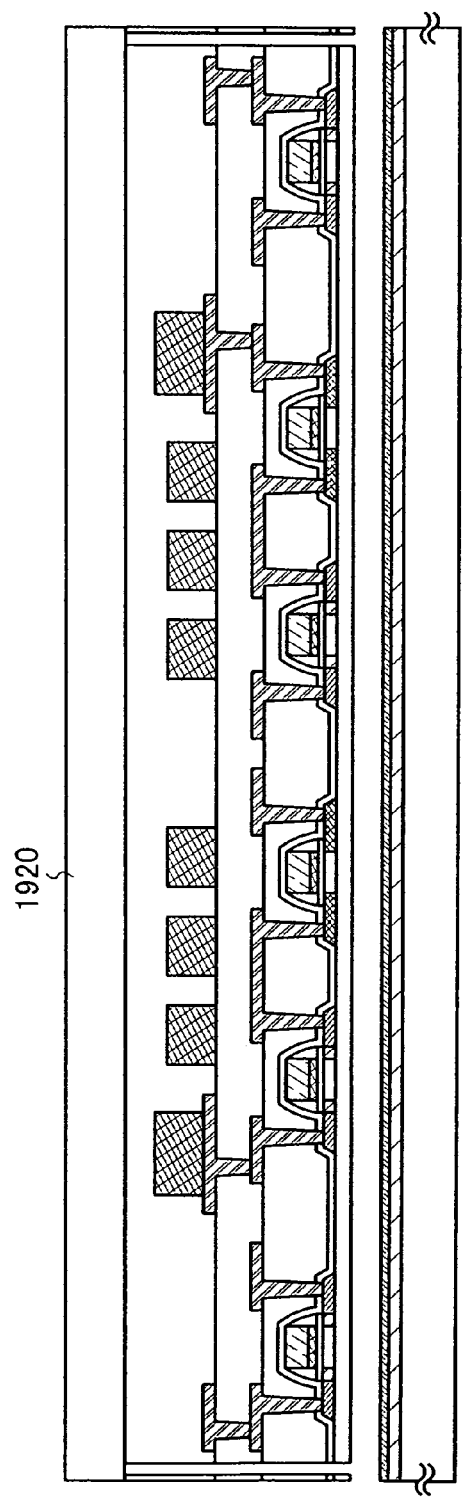
FIGS. 11A and 11B are cross-sectional views of a manufacturing method of a semiconductor device of the present invention in Embodiment Mode 4.

In this embodiment mode, as shown in FIG. 11A, after forming the opening portions in the element formation layer 1919 by laser beam irradiation, a first sheet material 1920 is attached to one surface of the element formation layer 1919 (the surface where the insulating film 1918 is exposed), and then the element formation layer 1919 is separated from the substrate 1901.

Figure 11B:
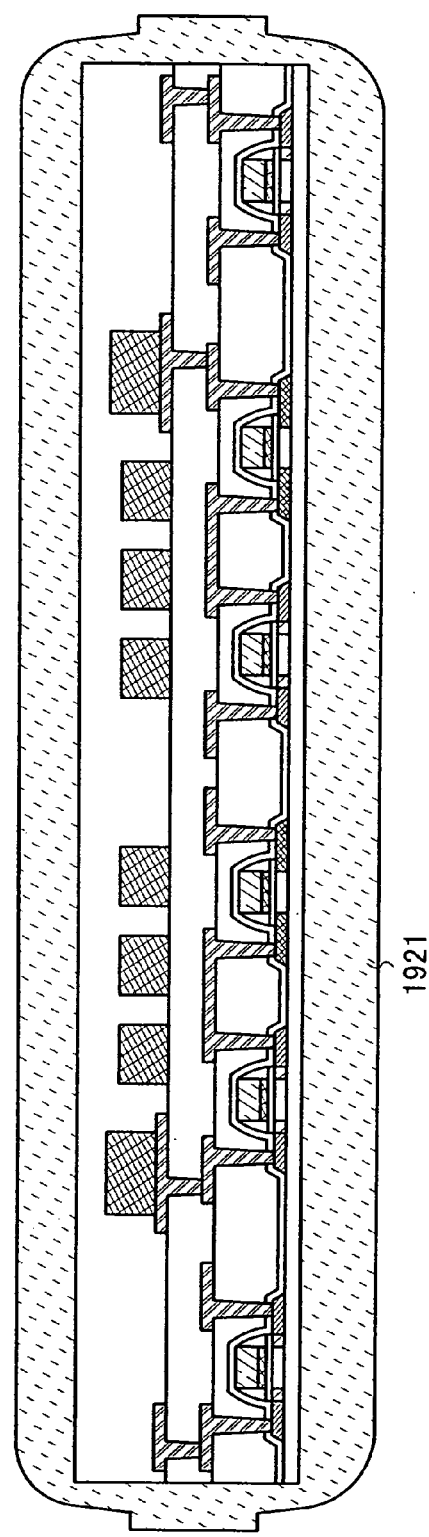

Next, as shown in FIG. 11B, a second sheet material 1921 is attached to the other surface of the element formation layer 1919 (the surface exposed by separation), followed by one or both of heat treatment and pressurization treatment. As the first sheet material 1920 and the second sheet material 1921, hot-melt films and the like can be used.

As the first sheet material 1920 and the second sheet material 1921, a film on which antistatic treatment for preventing static electricity or the like has been applied (hereinafter referred to as an antistatic film) can be used. As examples of the antistatic film, a film in which an antistatic material is dispersed in a resin, a film to which an antistatic material is attached, and the like can be given. The film provided with an antistatic material can be a film with an antistatic material provided over one of its surfaces, or a film with an antistatic material provided over each of its surfaces. In addition, the film with an antistatic material provided over one of its surfaces may be attached to the layer so that the antistatic material is placed on the inner side of the film or the outer side of the film. The antistatic material may be provided over the entire surface of the film, or over part of the film. As an antistatic material, a metal, indium tin oxide (ITO), or a surfactant such as an amphoteric surfactant, a cationic surfactant, or a nonionic surfactant can be used. In addition, as an antistatic material, a resin material which contains a cross-linked copolymer having a carboxyl group and a quaternary ammonium base on its side chain, or the like can be used. Such a material is attached, mixed, or applied to a film, so that an antistatic film can be formed. By sealing with the antistatic film, the semiconductor element can be prevented from adverse effects such as external static electricity when being dealt with as a commercial product.

In this embodiment mode, although an example in which the element formation layer 1919 is separated from the substrate 1901 is shown, the element formation layer 1919 may be formed over the substrate 1901 and used as a semiconductor device with no provision of the separation layer 1903. Note that, when an SOI (silicon on insulator) substrate is used as the substrate 1901, a single crystal semiconductor film may be used as a semiconductor film, and the length of a process of crystallization of a semiconductor film can be shortened.

As described above, using the manufacturing method of this embodiment mode, a small semiconductor device with flexibility in the physical configuration which is provided with the redundant circuit of the present invention with higher reliability can be provided.

Note that this embodiment mode can be combined with any of the other embodiments as appropriate.

Embodiment Mode 5

In this embodiment mode, an example of manufacturing the semiconductor device of the present invention by use of a transistor formed on a single crystal substrate will be described.

First, as shown in FIG. 12A, an element isolation insulating film 2301 for electrically isolating a semiconductor element is formed of an insulating film over a semiconductor substrate 2300. Formation of the element isolation insulating film 2301 makes it possible to electrically isolate a region for forming a transistor (element formation region 2302) from an element formation region 2303.

As the semiconductor substrate 2300, for example, any one of a single crystal silicon substrate which has n-type or p-type conductivity, a compound semiconductor substrate (a GaAs substrate, an InP substrate, a GaN substrate, an SiC substrate, a sapphire substrate, a ZnSe substrate, or the like) can be used. In addition an SOI (silicon on insulator) substrate formed using a bonding method or a SIMOX (separation by implanted oxygen) method can be used. In the case where the SOI substrate is used, the SOI substrate may be attached to a glass substrate.

For formation of the element isolation insulating film 2301, a selective oxidation method (LOCOS (local oxidation of silicon) method), a trench isolation method, or the like can be used.

Further, in this embodiment mode, an example in which a single crystal silicon substrate which has n-type conductivity is used as the semiconductor substrate 2300 and a p-well 2304 is formed in the element formation region 2303 is shown. The p-well 2304 formed in the element formation region 2303 of the semiconductor substrate 2300 can be formed by introducing an impurity element as selected which imparts p-type conductivity into the element formation region 2303. As the impurity element which imparts p-type conductivity, boron, aluminum, gallium, or the like can be used. On the other hand, in the case where a semiconductor substrate which has p-type conductivity is used as the semiconductor substrate 2300, an n-well may be formed in the element formation region 2302 by introducing an impurity element as selected which imparts n-type conductivity.

Note that an impurity element is not introduced into the element formation region 2302 because the semiconductor substrate which has n-type conductivity is used as the semiconductor substrate 2300 in this embodiment mode. However, an n-well may be formed in the element formation region 2302 by introduction of an impurity element which imparts n-type conductivity. As the impurity element which imparts n-type conductivity, phosphorus, arsenic, or the like can be used.

Next, as shown in FIG. 12B, insulating films 2305 and 2306 are formed so as to cover the element formation regions 2302 and 2303, respectively. In this embodiment mode, the insulating films 2305 and 2306 may be formed of silicon oxide films formed in the element formation regions 2302 and 2303 by thermal oxidization of the semiconductor substrate 2300. Alternatively, each of the insulating films 2305 and 2306 may be formed as a stacked layer of a silicon oxide film and a silicon oxynitride film by forming the silicon oxide film by thermal oxidation and then nitriding a surface of the silicon oxide film by nitridation treatment.

Further alternatively, the insulating films 2305 and 2306 may be formed using plasma treatment as described above. For example, by oxidizing or nitriding the surfaces of the semiconductor substrate 2300 by high-density plasma treatment, silicon oxide films or silicon nitride films to be used as the insulating films 2305 and 2306 can be formed in the element formation regions 2302 and 2303.

Next, as shown in FIG. 12C, a conductive film is formed so as to cover the insulating films 2305 and 2306. In this embodiment mode, an example in which a conductive film 2307 and a conductive film 2308 are sequentially stacked as the conductive film is shown. The conductive film may be formed as a single layer of a conductive film or as a stacked structure in which three or more conductive films are stacked.

The conductive film 2307 and the conductive film 2308 can be formed of tantalum, tungsten, titanium, molybdenum, aluminum, copper, chromium, niobium, or the like, a film formed of an alloy containing any of the above metals as its main component, or a film formed of a compound containing any of the above metals. Alternatively, semiconductor such as polycrystalline silicon doped with an impurity element which imparts conductivity, such as phosphorus, may be used. In this embodiment mode, the conductive film 2307 is formed using tantalum nitride, and the conductive film 2308 is formed using tungsten.

Next, as shown in FIG. 13A, by processing (patterning or the like) the stacked conductive films 2307 and 2308 to have predetermined shapes, a gate electrode 2309 and a gate electrode 2310 are formed over the insulating films 2305 and 2306.

Next, as shown in FIG. 13B, a mask 2311 is formed as selected using a resist so as to cover the element formation region 2302, and an impurity element is introduced into the element formation region 2303. Since the gate electrode 2310 as well as the mask 2311 function as masks, by introduction of the impurity element, impurity regions 2312 functioning as source or drain regions and a channel formation region 2313 are formed in the p-well 2304. As the impurity element, an impurity element which imparts n-type conductivity or an impurity element which imparts p-type conductivity is used. As the impurity element which imparts n-type conductivity, phosphorus, arsenic, or the like can be used. As the impurity element which imparts p-type conductivity, boron, aluminum, gallium, or the like can be used. In this embodiment mode, phosphorus is used as the impurity element.

After the mask 2311 is removed, a mask 2314 is formed as selected using a resist so as to cover the element formation region 2303 as shown in FIG. 13C, and an impurity element is introduced into the element formation region 2302. Since the gate electrode 2309 as well as the mask 2314 function as masks, by introduction of the impurity element, impurity regions 2315 functioning as source or drain regions and a channel formation region 2316 are formed in the semiconductor substrate 2300 in the element formation region 2302. As the impurity element, an impurity element which imparts n-type conductivity or an impurity element which imparts p-type conductivity is used. As the impurity element which imparts n-type conductivity, phosphorus, arsenic, or the like can be used. As the impurity element which imparts p-type conductivity, boron, aluminum, gallium, or the like can be used. In this embodiment mode, an impurity element which imparts conductivity which is different from that of the impurity element introduced into the element formation region 2303 in FIG. 13C (for example, boron (B)) is introduced.

Figure 14A:
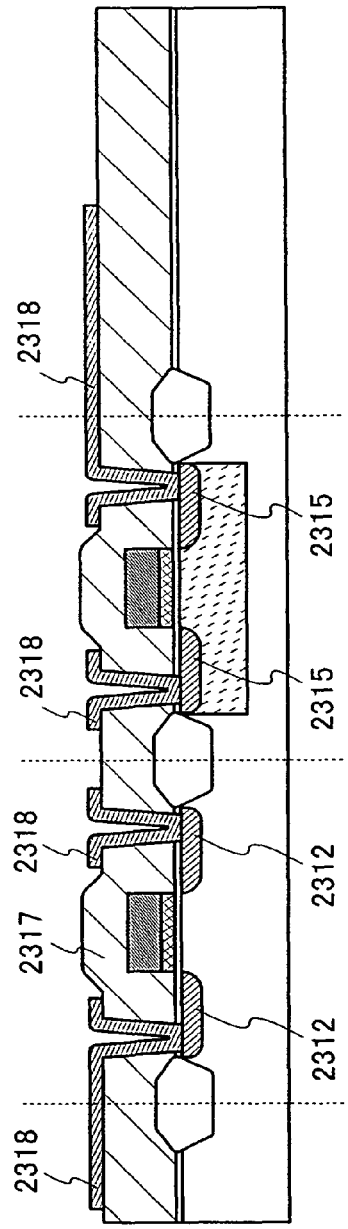
FIGS. 14A and 14B are cross-sectional views of a manufacturing method of a semiconductor device of the present invention in Embodiment Mode 5.

Next, as shown in FIG. 14A, an insulating film 2317 is formed so as to cover the insulating films 2305 and 2306 and the gate electrodes 2309 and 2310, and then contact holes are formed in the insulating film 2317 so that the impurity regions 2312 and 2315 are partly exposed. Then, conductive films 2318 connected to the impurity regions 2312 and 2315 through the contact holes are formed. The conductive films 2318 can be formed by a CVD method, a sputtering method, or the like.

The insulating film 2317 can be formed using an inorganic material, an organic material, or a mixed material of an inorganic material and an organic material. For example, a film containing silicon oxide, silicon oxynitride, silicon nitride oxide, carbon typified by DLC (diamond-like carbon), acrylic, epoxy, polyimide, polyamide, polyvinylphenol, benzocyclobutene, or the like can be used. In addition, the insulating film 2317 can be formed by a CVD method, a sputtering method, a droplet discharging method, a printing method, or the like, depending on the material of the insulating film 2317.

Note that a transistor used for the semiconductor device of the present invention is not limited to a structure described in this embodiment mode. For example, an inversely-staggered structure may be employed.

Figure 14B:
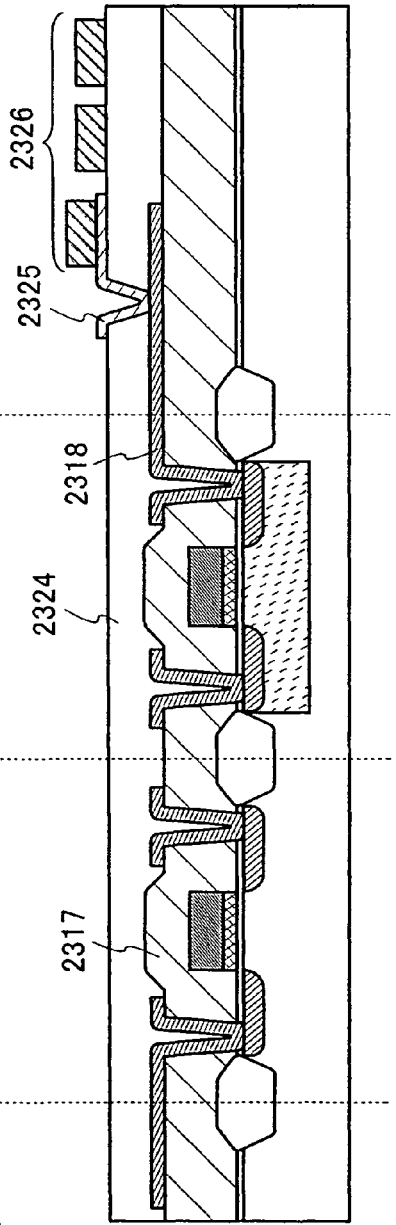
Figure 15A:
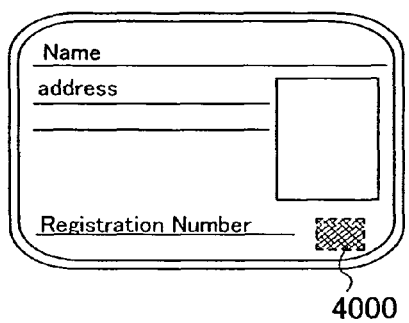
FIGS. 15A to 15F are diagram illustrating examples of use of a semiconductor device of the present invention in Embodiment Mode 6.
Figure 15B:
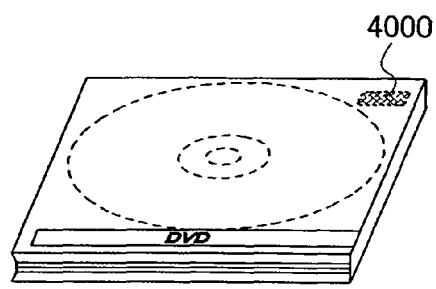
Figure 15C:
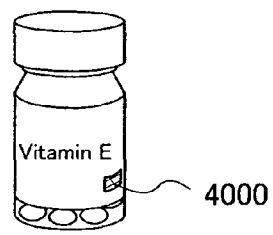
Figure 15D:
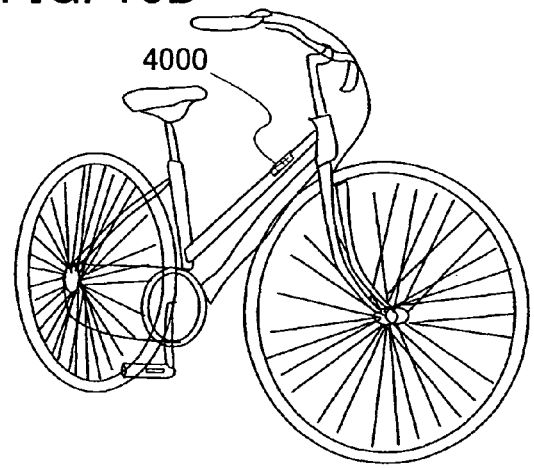
Figure 15E:
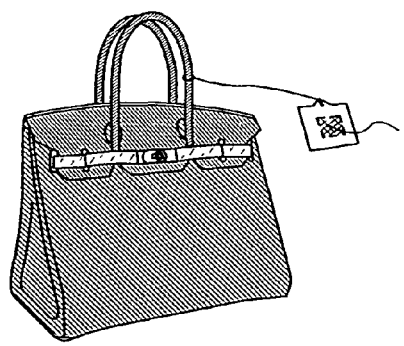
Figure 15F:
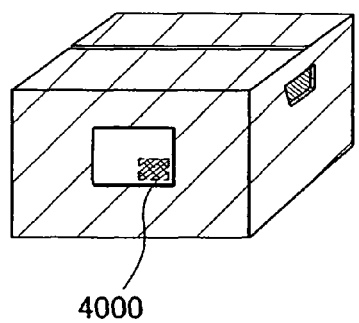

Next, as shown in FIG. 14B, an interlayer film 2324 is formed. Then, the interlayer film 2324 is etched to form a contact hole so that the conductive film 2318 is partly exposed. The interlayer film 2324 is not limited to a resin and may be any other film such as a CVD oxidation film; however, it is desirable that the interlayer film 2324 be a resin in terms of planarity. Alternatively, a contact hole may be formed using a photosensitive resin without etching. After that, a wiring 2325 in contact with the conductive film 2318 through the contact hole is formed over the interlayer film 2324.

Next, a conductive film 2326 functioning as an antenna is formed so as to be in contact with the wiring 2325. The conductive film 2326 can be formed using a metal such as silver, gold, copper, palladium, chromium, platinum, molybdenum, titanium, tantalum, tungsten, aluminum, iron, cobalt, zinc, tin, or nickel. Alternatively, as the conductive film 2326, a film formed of an alloy containing the metal as its main component or a film formed of a compound containing the metal may be used instead of a film formed of any of the above metals. The conductive film 2326 can be formed as a single layer of the above film or a stacked layer of the above plurality of films.

The conductive film 2326 can be formed by a CVD method, a sputtering method, a printing method such as screen printing or gravure printing, a droplet discharging method, a dispenser method, a plating method, a photolithography method, an evaporation method, or the like.

Note that an example in which an antenna and a semiconductor element are formed over one substrate is described in this embodiment; however, the present invention is not limited thereto. After formation of the semiconductor element, an antenna which is separately formed may be electrically connected to an integrated circuit. In this case, the antenna and the integrated circuit can be electrically connected to each other after being pressure-bonded with an anisotropic conductive film (ACF), anisotropic conductive paste (ACP), or the like. Alternatively, a conductive adhesive such as a silver paste, a copper paste, or a carbon paste; solder joint; or the like can be used for the connection.

As described above, by using the manufacturing method of this embodiment mode, variations in the characteristics of transistors can be suppressed. Therefore, the number of transistors used for the semiconductor device can be reduced and a semiconductor device of the present invention with higher redundancy can be provided.

Note that this embodiment mode can be combined with any of the other embodiment modes, as appropriate.

Embodiment Mode 6

In this embodiment mode, an example of usage of a semiconductor device in the above embodiment modes will be described.

An example of usage of a semiconductor device provided with a clock generation circuit in the above embodiment mode will be described with reference to FIGS. 15A to 15F. Although a semiconductor device can be used broadly, it may be used by being mounted in products such as, bills, coins, securities, bearer bonds, certificates (driver's licenses, resident cards, or the like, see FIG. 15A), containers for wrapping objects (wrapping paper, bottles, or the like, see FIG. 15C), recording media (DVDS, video tapes, or the like, see FIG. 15B), vehicles (bicycles or the like, see FIG. 15D), products such as personal belongings (bags, glasses, or the like), foods, plants, animals, human bodies, clothes, commodities, or electronic devices (a liquid crystal display device, an EL display device, a television device, or a cellular phone), or objects such as shipping tags of products (see FIGS. 15E and 15F).

A semiconductor device 4000 of the present invention is mounted on a printed substrate, attached to a surface, or incorporated to be fixed in an object. For example, the semiconductor device is incorporated in paper of a book or an organic resin of a package to be fixed in each object. As for the semiconductor device 4000 of the present invention, a small size, a thin shape, and lightweight are achieved and an attractive design of the object itself is not damaged even after being fixed in the object. In addition, by the semiconductor device 4000 of the present invention being provided in bills, coins, securities, bearer bonds, certificates, or the like, a certification function can be obtained and forgery thereof can be prevented by the use of the certification function being made. Further, by the semiconductor device 4000 of the present invention being provided in containers for wrapping objects, recording media, personal belongings, foods, clothes, commodities, electronic devices, or the like, a system such as an inspection system can be performed efficiently. In addition, even for a vehicle, the level of security against theft or the like can be raised when the semiconductor device of the present invention is attached to the vehicle.

As described above, when a semiconductor device of the present invention is used for each application given in this embodiment mode, for example, high reliability can be realized. Accordingly, authentication characteristics, security, or the like of an article can be improved.

The present application is based on Japanese Priority Patent Application No. 2007-151453 filed on Jun. 7, 2007 with the Japan Patent Office, the entire contents of which are hereby incorporated by reference.

What is claimed is:

1. A semiconductor device comprising:
a power source circuit;
a power source control circuit electrically connected to the power source circuit;
a first functional circuit electrically connected to the power source control circuit; and
a second functional circuit electrically connected to the power source control circuit,
wherein the power source control circuit comprises: a selector circuit configured to select one of the first functional circuit and the second functional circuit;
a timer circuit configured to count a predetermined period; and
a short circuit judgment circuit configured to judge whether power source in the selected functional circuit is short-circuited or not during the predetermined period, and
wherein the power source control circuit selects one of the first functional circuit and the second functional circuit and controls an electric current output from the power source circuit to a selected functional circuit among the first and second functional circuits.

2. The semiconductor device according to claim 1, wherein the power source circuit, the power source control circuit, and the first and second functional circuits are provided over a same substrate.

3. The semiconductor device according to claim 1, wherein the power source circuit, the power source control circuit, and the first and second functional circuits are provided over a substrate having flexibility.

4. A semiconductor device comprising:
a power source circuit;
a power source control circuit electrically connected to the power source circuit;
a first functional circuit electrically connected to the power source control circuit; and
a second functional circuit electrically connected to the power source control circuit,
wherein the power source control circuit comprises:
a selector circuit configured to select one of the first functional circuit and the second functional circuit;
a power source distribution circuit configured to output a voltage to a selected functional circuit by the selector circuit;
a timer circuit configured to count a predetermined period;
a short circuit judgment circuit configured to judge whether power source in the selected functional circuit is short-circuited or not during the predetermined period; and
an electric current adjustment circuit configured to control an electric current output from the power source circuit to the selected functional circuit in accordance with a result from the short circuit judgment circuit.

5. The semiconductor device according to claim 4, wherein the short circuit judgment circuit judges whether power source is short-circuited or not by judging a voltage input to the selected functional circuit.

6. The semiconductor device according to claim 4, wherein the power source circuit, the power source control circuit, and the first and second functional circuits are provided over a same substrate.

7. The semiconductor device according to claim 4, wherein the power source circuit, the power source control circuit, and the first and second functional circuits are provided over a substrate having flexibility.

8. A semiconductor device comprising:
a power source circuit;
a power source control circuit electrically connected to the power source circuit;
a first redundant circuit electrically connected to the power source control circuit; and
a second redundant circuit electrically connected to the power source control circuit,
wherein each of the first and second redundant circuits comprises:
first, second, and third functional circuits; and
a majority decision circuit electrically connected to the first, second, and third functional circuits,
wherein the power source control circuit comprises:
a selector circuit configured to select one of the first redundant circuit and the second redundant circuit;
a power source distribution circuit configured to output a voltage to a selected redundant circuit by the selector circuit;
a timer circuit configured to count a predetermined period;
a short circuit judgment circuit configured to judge whether power source in the selected redundant circuit is short-circuited or not during the predetermined period; and
an electric current adjustment circuit configured to control an electric current output from the power source circuit to the selected redundant circuit in accordance with a result from the short circuit judgment circuit.

9. The semiconductor device according to claim 8, wherein the short circuit judgment circuit judges whether power source is short-circuited or not by judging a voltage input to the selected redundant circuit.

10. The semiconductor device according to claim 8, wherein the power source circuit, the power source control circuit, the first and second redundant circuits are provided over a same substrate.

11. The semiconductor device according to claim 8, wherein the power source circuit, the power source control circuit, the first and second redundant circuits are provided over a substrate having flexibility.

12. A semiconductor device comprising:
an antenna portion configured to transmit and receive a signal;
an analog portion configured to generate a power source voltage in accordance with the signal; and
a logic portion configured to perform arithmetic processing by using the signal,
wherein the analog portion comprises:
a power source circuit;
a reset circuit;
a clock generation circuit;
a demodulation circuit; and
a modulation circuit,
wherein the logic portion comprises:
a ROM;
a RAM;
a controller; and
an arithmetic processing circuit portion,
wherein the arithmetic processing circuit portion comprises:
a power source control circuit;
a first CPU;
a second CPU; and
a signal selection circuit, and
wherein the power source control circuit comprises:
a selector circuit configured to select one of the first CPU and the second CPU;
a power source distribution circuit configured to output a voltage to a selected CPU by the selector circuit;
a timer circuit configured to count a predetermined period;
a short circuit judgment circuit configured to judge whether power source in the selected CPU is short-circuited or not during the predetermined period; and
a voltage adjustment circuit configured to control a voltage value output from the analog portion to the selected CPU in accordance with a result from the short circuit judgment circuit.

13. The semiconductor device according to claim 12, wherein the short circuit judgment circuit judges whether power source is short-circuited or not by judging a voltage value to be input to the selected CPU.

14. The semiconductor device according to claim 12, wherein the antenna portion, the analog portion, and the logic portion are provided over a same substrate.

15. The semiconductor device according to claim 12, wherein the antenna portion, the analog portion, and the logic portion are provided over a substrate having flexibility.

* * * * *